United States Patent [19]
Carayannis et al.

[11] Patent Number: 5,155,771
[45] Date of Patent: Oct. 13, 1992

[54] SPARSE SUPERLATTICE SIGNAL PROCESSOR

[75] Inventors: George Carayannis; Christos Halkias, both of Athens, Greece; Dimitris Manolakis, Chestnut Hill, Mass.; Elias Koukoutsis, Athens, Greece

[73] Assignee: Adler Research Associates, Union, N.J.

[21] Appl. No.: 879,711

[22] Filed: May 6, 1992

Related U.S. Application Data

[63] Continuation of Ser. No. 501,956, Mar. 29, 1990, abandoned, which is a continuation of Ser. No. 379,717, Jul. 13, 1989, abandoned, which is a continuation of Ser. No. 166,663, Mar. 11, 1988, abandoned.

[51] Int. Cl.$^5$ .............................................. G10L 5/00
[52] U.S. Cl. ........................................ 381/29; 381/41; 381/36
[58] Field of Search ................................ 381/29–41; 364/724.15

[56] References Cited

U.S. PATENT DOCUMENTS

| | | |
|---|---|---|
| 4,340,781 | 7/1982 | Ichikawa et al. ............... 364/725.15 |
| 4,378,469 | 3/1983 | Fette . |
| 4,389,540 | 6/1983 | Nakamura . |
| 4,401,855 | 8/1983 | Broderson . |
| 4,544,919 | 10/1985 | Gerson ................................. 381/41 |
| 4,641,238 | 2/1987 | Kneib . |
| 4,740,906 | 4/1988 | Renner et al. ................... 364/724.15 |
| 4,750,190 | 6/1988 | Moreau et al. ........................ 381/41 |

OTHER PUBLICATIONS

Carayannis et al., "A New Look on the Parallel Implementation of the Shur Algorithm for the Solution of Toeplitz Equations", IEEE ICASP 85, Mar. 1985.
N. Levinson, "The Wiener RMS (Root-Mean-Square) Error Criterion in Filter Design and Prediction", J. Math Phys., vol. 25, pp. 261-278, Jan. 1947.
J. Durbin, "The Fitting of Time Series Models", Rev. Int. Statist. Inst., vol. 28, pp. 233-244, 1960.

Primary Examiner—Emanuel S. Kemeny
Attorney, Agent, or Firm—Davis Hoxie Faithfull & Hapgood

[57] ABSTRACT

A parametric signal processing structure, which receives autocorrelation coefficients, produces, in an additive sparse superlattice embodiment, quantities $\lambda_i^+$, defined as $(1-k_m)(k_{m-1}+1)$, and in a subtractive sparse superlattice embodiment, quantities $\lambda_m^-$, defined as $(1+k_m)(1-k_{m-1})$, where the quantities $k_i$ correspond to the lattice predictor coefficients, or PARCORS of the signal under study. The additive and subtractive sparse superlattice processing structures are strictly optimal in terms of hardware and complexity, yet lend themselves to implementation in a fully parallel, fully sequential, or parallel partitioned manner.

5 Claims, 10 Drawing Sheets

FIG. I

BASIC CELL 1 ———
BASIC CELL 2 — — —
BASIC CELL 3 ••••••

SPARSE SUPERLATTICE SIGNAL PROCESSOR

This is a continuation of copending application Ser. No. 07/501,956 filed on Mar. 29, 1990 now abandoned, which is a continuation of copending application Ser. No. 07/379,717 filed on Jul. 13, 1989 now abandoned, which is a continuation of copending application Ser. No. 07/166,663 filed on Mar. 11, 1988 now abandoned.

The present invention is related to the following co-pending U.S. patent applications:
i) Ser. No. 837,260 by Carayannis et al, filed Mar. 7, 1986, entitled OPTIMAL PARAMETRIC SIGNAL PROCESSOR.
ii) Ser. No. 904,382 by Carayannis et al, filed Sep. 4, 1986, entitled OPTIMAL PARAMETRIC SIGNAL PROCESSOR WITH LATTICE BASIC CELL.
iii) Ser. No. 021,256 by Koukoutsis et al, filed Mar. 3, 1987, entitled OPTIMAL PARAMETRIC SIGNAL PROCESSOR FOR LEAST SQUARE FINITE IMPULSE RESPONSE FILTERING.
iv) Ser. No. 084,929 by Carayannis et al, filed Aug. 12, 1987, entitled SIDE-FED SUPERLATTICE FOR THE PRODUCTION OF LINEAR PREDICTOR AND FILTER COEFFICIENTS.

The entire disclosures of each of the four applications identified above are hereby incorporated by reference thereto.

FIELD OF THE INVENTION

The present invention relates to the field of signal processing, and in particular, the parametric signal processing.

BACKGROUND OF THE INVENTION

Parametric signal processing is used in many areas such as speech and image analysis, synthesis and recognition, neurophysics, geophysics, array processing, computerized tomography, communications and astronomy, to name but a few.

One example of signal processing of particular importance is the linear prediction technique which may be used for spectral estimation, and in particular for speech analysis, synthesis and recognition and for the processing of seismic signals, to enable the reconstruction of geophysical substrata. The linear prediction technique employs a specialized autocorrelation function.

Another form of signal processing which finds a multitude of applications, is the determination of an optimal (in the least square sense) finite impulse response (FIR) filter. A signal processor employing such a technique works with the autocorrelation of the filter input signal and the cross-correlation between the input and the desired response signal, and may be used in many of the above-mentioned applications.

Still another form of signal processing of particular importance is known in the art as "L-step ahead" prediction and filtering, for solving the "optimum lag" problem. This technique is especially useful in designing spiking and shaping filters. Signal processors which perform this function employ a specialized autocorrelation function which also takes into account a time lag associated with the system.

Generally, as the order of the system under investigation increases, the complexity of the signal processing necessary to provide useful information also increases. For example, using the general Gaussian elimination procedure, a system of order p can be processed in "$O(p^3)$" steps, indicating the number of steps as being "on the order of" $p^3$, i.e., a function of p cubed. Thus, it will be appreciated that a system having order of $p=100$ requires on the order of one million processing steps to process the signal, a limitation of readily apparent significance, especially where real time processing is required.

Signal processing techniques have been developed which have reduced the number of operations required to process a signal. One such method has been based on a technique developed by N. Levinson, which requires $O(p^2)$ sequential operations to process the signal. In particular, the "Levinson technique" requires $O(2.p^2)$ sequential operations in order to process the signal. A version of this technique, known as the "Levinson-Durbin" technique, which is specialized for the linear prediction problem, requires $O(1.p^2)$ sequential operations to process the signal. Neither of these schemes is suitable for parallel implementation. On the general subject of the Levinson and Levinson-Durbin techniques, see N. Levinson, "The Wiener RMS (Root-Mean-Square) Error Criterion in Filter Design and Prediction", *J. Math Phys.*, Vol. 25, pages 261-278, January 1947; and J. Durbin, "The Filtering of Time Series Models", *Rev, Int. Statist. Inst.*, Vol. 28, pages 233-244, 1960.

Although they represent an order of magnitude improvement over the Gaussian elimination technique, the Levinson and Levinson-Durbin techniques are too slow for many complex systems where real time processing is required.

Another way of implementing the main recursion of the Levinson-Durbin technique, for the computation of what is widely known as "lattice coefficients", was developed by Schur in 1917, in order to establish a system stability criterion. See I. Schur, "Uber Potenzreihen Die In Innern Des Einheitskreises Beschrankt Sind", *J. Reine Angewandte Mathematik*, Vol. 147, 1917, pages 205-232. Lev-Ari and Kailath, of Stanford University, have developed a different approach, based on the Schur and Levinson techniques, which provides a triangular "ladder" structure for signal processing. The Lev-Ari and Kailath technique uses the signal, per se, as the input to the processor, rather than autocorrelation coefficients, and it is used in the signal modelling context. See H. Lev-Ari and T. Kailath, "Schur and Levinson Algorithms for Non-Stationary Processes", *IEEE International Conference on Acoustics, Speech and Signal Processing*, 1981, pages 860-864.

In another modification to the Schur technique, Le Roux and C. Gueguen rederived the Schur algorithm, giving emphasis to the finite word length implementation, using fixed point arithmetics. See Le Roux and Gueguen, "A Fixed Point Computation of Partial Correlation, Coefficients", *IEEE Transactions on Acoustics, Speech, and Signal Processing*, June 1977, pages 257-259.

Finally, Kung and Hu, have developed a parallel scheme, based on the Schur technique, which uses a plurality of parallel processors, to process a signal, having order p, in $O(p)$ operations, a significant improvement compared to the Levinson-Durbin technique. See Kung and Hu, "A Highly Concurrent Algorithm and Pipelined Architecture for Solving Toeplitz Systems", *IEEE Transactions on Acoustics, Speech and Signal Processing*, Vol. ASSP-31, No. 1, February 1983, pp. 66-76. However, the application of the Kung and Hu technique is severely limited insofar as it requires that the number of processors be equal to the order of the system to be solved. Thus, the Kung and Hu technique cannot process a signal produced by a system having an order greater than the number of parallel processors. System complexity is therefore a major limiting factor in using the Kung and Hu technique, insofar as many complex systems may have orders much higher than the number of parallel processors currently available in modern VLSI or other technology.

The co-pending patent applications, identified above, overcome the difficulties associated with the prior art signal processors and methods by providing optimal techniques for obtaining lattice predictor coefficients (in Ser. Nos. 837,260 and 904,382), for obtaining lattice filter coefficients, for LS-FIR filtering (in Ser. No. 021,256), and for obtaining direct predictor and filter coefficients, for linear prediction and LS-FIR filtering (in Ser. No. 084,929).

The techniques employed in the co-pending applications use "superlattice" and "superladder" structures to implement the recursions disclosed in the applications. These superlattice and superladder structures are "two-order" structures, meaning that the basic computational elements of such structures produce intermediate and final filter, or predictor, values, e.g., of order $m+1$, by processing only values having order m. For example, FIG. 1 herein, which is based on FIG. 3 of co-pending application Ser. Nos. 837,260 and 904,382, illustrate that the intermediate and final values of $\zeta_i^m$, having orders m are produced from intermediate values of $\zeta_i^{m-1}$, having order $m-1$.

Specifically, a system signal is applied to a digital autocorrelator 10, FIG. 1, which produces autocorrelation coefficients $r_0$ through $r_8$, which characterize the system. The coefficients are applied to an input device 12, such as a digital register or memory. Each autocorrelation coefficient, except for the first, $r_0$, and the last, $r_8$, is multiplied by a first lattice predictor coefficient $k_1$, which is produced from $r_0$ and $r_1$ ($\zeta_0^0$ and $\zeta_1^0$), according to the general formula:

$$k_p = -\zeta_p^{p-1}/\zeta_0^{p-1}$$

The product of each such multiplication is added, individually, to the adjacent two autocorrelation coefficients, to produce the first intermediate values $\zeta_n^1$, where $n=0, 2$ through 8 and $-1$ to $-6$. For example, autocorrelation coefficient $r_3$, designated as $\zeta_3^0$ and $\zeta_{-3}^0$, for the sake of conformance with the intermediate variables, is multiplied by lattice predictor coefficient $k_1$ in multipliers 14 and 16, respectively, and autocorrelation coefficients $r_2$ and $r_4$ are added, individually, to each product, in adders 18 and 20, respectively, to produce a pair of first intermediate values $\zeta_{-2}^1$ and $\zeta_4^1$, respectively. Similarly, another two first intermediate values, e.g., $\zeta_{-1}^1$ and $\zeta_3^1$, are produced by multiplying autocorrelation coefficient $r_2$ by the lattice predictor coefficient $k_1$, and adding, individually, the adjacent autocorrelation coefficients, $r_1$ and $r_3$ to the products.

The second intermediate values are derived from the first intermediate values in a similar manner. First, $k_2$ is derived from the ratio of $\zeta_2^1$ and $\zeta_0^1$ in accordance with the formula given above. Then, second intermediate values $\zeta_3^2$ and $\zeta_0^2$, for example, are produced by multiplying the first intermediate values $\zeta_{-1}^1$ and $\zeta_2^1$ by the lattice predictor coefficient $k_2$, and adding the adjacent first intermediate values $\zeta_3^1$ and $\zeta_0^1$ to the products, individually. The signal processing continues according to the basic lattice recursion disclosed in Ser. Nos. 837,260 and 904,382, until the final values $\zeta_8^7$ and $\zeta_0^7$ are obtained, from which the last lattice predictor coefficient $k_8$ can be produced.

The lattice predictor coefficients $k_i$ completely characterize the linear predictor and can be used instead of the direct predictor coefficients $a_i$. They are many times preferred for storage, transmission and fast speech synthesis, since they have the advantages of being ordered, bounded by unity and can readily be used for stability control, efficient quantization, and the like. Since $r_0$ corresponds to the energy of the signal, and will therefore have the greatest amplitude of any of the signals processed by the superlattice, all variables can be normalized with respect to $r_0$, thus facilitating the use of fixed point processing, with its advantages of precision, speed and processing simplicity.

FIG. 2 illustrates a butterfly basic cell from which the superlattice of FIG. 1 can be constructed, as disclosed in co-pending application Ser. No. 837,260. As taught by that co-pending application, the superlattice structure of FIG. 1 can be implemented by the repeated use of such butterfly basic cells, in the manner illustrated in FIG. 3. The reference numerals used in FIG. 2 correspond to those of FIG. 1.

Referring to FIG. 2, it will be appreciated that the multiplication of $r_3$ by $k_1$ is performed twice, in multipliers 14 and 16. This double operation can be eliminated by employing a single multiplier 16' in a "reduced basic cell", illustrated in FIG. 4. In this case, the multiplier 16' provides two outputs, one of which is added to $r_2$ in adder 18, to provide the intermediate quantity $\zeta_{-2}^1$, and a second output which is added to $r_4$ in adder 20, to produce intermediate value $\zeta_4^1$. This hardware reduction, however, can only be achieved for those basic cells used to produce the first intermediate values, since all succeeding basic cells receive at their inputs four distinct quantities.

OBJECTS AND SUMMARY OF THE INVENTION

It is therefore an object of the present invention to provide an optimal parametric signal processing structure in which such double operations are eliminated throughout the processing structure.

It is a further object of the present invention to provide an optimal parametric signal processor of strictly minimal hardware complexity.

It is a further object of the present invention to provide an optimal signal processor, having minimal hardware complexity, which can be implemented using (i) a single processing unit to process a signal in a fully sequential manner, (ii) a plurality of processing units to process a signal in a fully parallel manner, or (iii) a lesser plurality of processing units to process a signal in a partitioned parallel manner.

It is a further object of the present invention to provide an optimal parametric signal processor which employs a three-order structure as a basic cell.

It is a further object of the present invention to provide an optimal parametric signal processor which is minimal in terms of hardware complexity, and which permits a finite word length implementation.

It is a further object of the present invention to provide an optimal parametric signal processing structure, having minimal hardware complexity, for producing (i) lattice predictor coefficients, (ii) linear predictor coefficients, (iii) linear phase predictor coefficients, (iv) constant group delay predictor coefficients, and (v) LS-FIR optimal filter coefficients.

It is yet another object of the present invention to provide a structure called the "additive sparse superlattice", which receives autocorrelation coefficients, and produces therefrom quantities $\lambda_i^+$, defined as $(1-k_i)(k_{i-1}+1)$, where the quantities $k_i$ correspond to the lattice predictor coefficients, or "PARCORS" of the signal.

A particular implementation of the additive sparse superlattice includes a plurality of adders, a plurality of multipliers, a storage and retrieval structure, and a divider. The storage and retrieval structure selectively applies a first plurality of pairs of adjacent autocorrelation coefficients to a plurality of adders to produce an associated plurality of first intermediate values. The storage and retrieval structure selectively applies a plurality of the autocorrelation coefficients to the plurality of multipliers to produce an associated plurality of first products, and also selectively reapplies an adjacent pair of the first intermediate values, and a selected one of the first products, to each of a plurality of the adders, to thereby produce an associated plurality of second intermediate values. The divider initially divides a selected first intermediate value by a value related to the zeroth order autocorrelation coefficient, to thereby produce a first of the quantities $\lambda_i^+$, and thereafter divides a selected second intermediate value by the selected first intermediate value, to thereby produce a second of the quantities $\lambda_i^+$. The first of the quantities $\lambda_i^+$ is applied to the plurality of multipliers to produce the plurality of second intermediate values.

It is yet another object of the present invention to provide a structure called the "subtractive sparse superlattice" which receives autocorrelation coefficients and produces therefrom quantities $\lambda_i^-$, defined as $(1+k_m)(1-k_{m-1})$, where the quantities $k_i$ correspond to the lattice predictor coefficients, or PARCORS of the signal.

A particular implementation of the subtractive sparse superlattice also includes a plurality of adders, a plurality of multipliers, a storage and retrieval structure, and a divider. The storage and retrieval structure selectively applies a plurality of pairs of differences between adjacent autocorrelation coefficients to the plurality of adders, to produce an associated plurality of second intermediate values. The storage and retrieval structure also selectively applies a plurality of differences between adjacent autocorrelation coefficients to the plurality of multipliers to produce an associated plurality of first products, and selectively reapplies an adjacent pair of the second intermediate values, and a selected one of the first products, to each of a plurality of the adders, to produce an associated plurality of third intermediate values. The divider initially divides a selected second intermediate value by the difference between the zeroth and first autocorrelation coefficients, to thereby produce a first of the quantities $\lambda_i^-$, and thereafter divides a selected third intermediate value by the selected second intermediate value, to thereby produce a second of said quantities $\lambda_i^+$. The first of the quantities $\lambda_i^+$ is applied to the plurality of multipliers to produce the plurality of third intermediate values.

BRIEF DESCRIPTION OF THE DRAWINGS

These and other objects, aspects and embodiments of the present invention will now be described in more detail with reference to the following drawing figures of which.

DETAILED DESCRIPTION OF THE INVENTION

Figure 1:
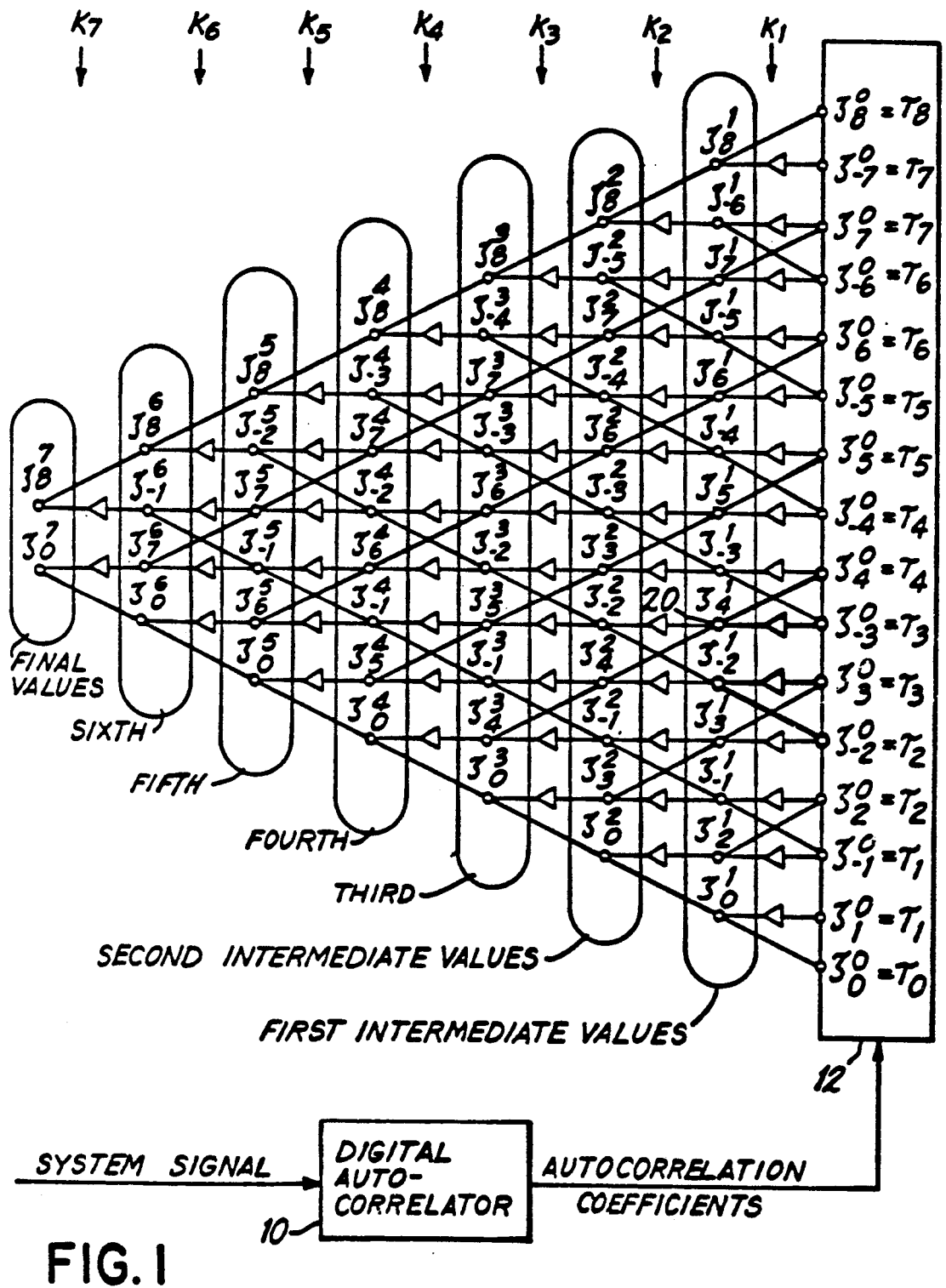
FIG. 1 is an illustration of a superlattice processing structure, in accordance with copending U.S. patent application Ser. Nos. 837,260 and 904,382.
Figure 2:
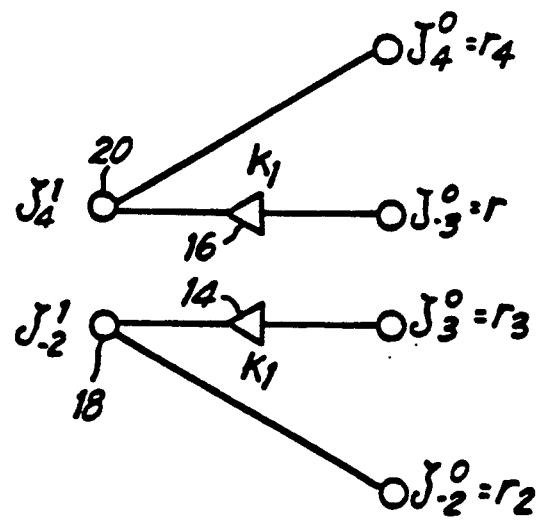
FIG. 2 is an illustration of the "butterfly basic cell" which can be employed to produce the superlattice processing structure of FIG. 1.
Figure 3:
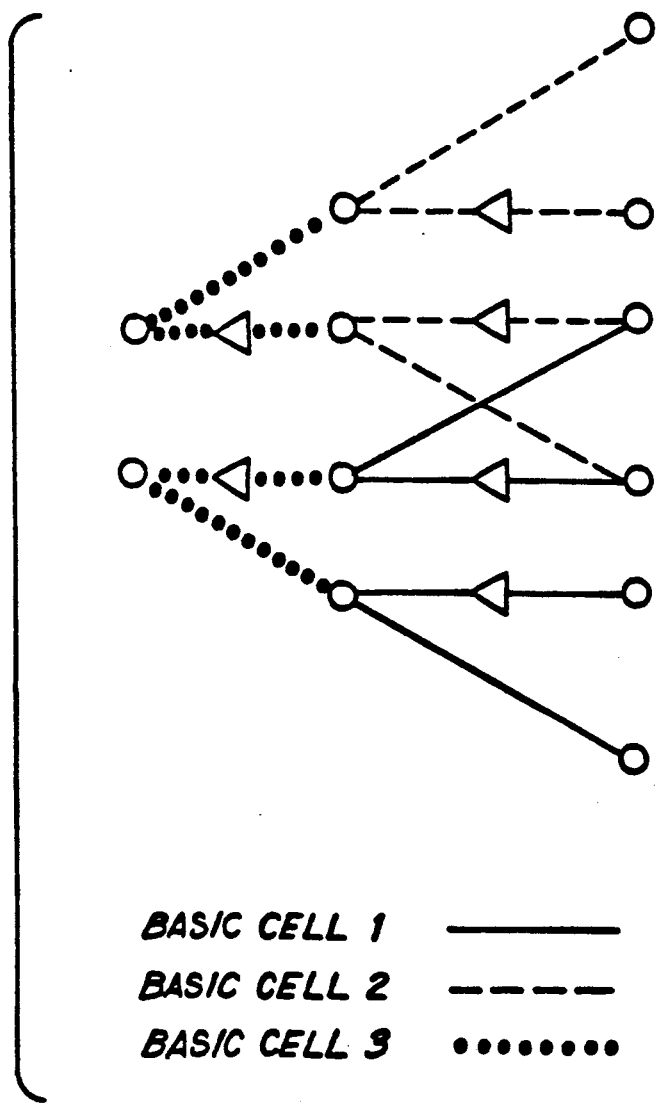
FIG. 3 is a diagram illustrating how the superlattice structure can be implemented through the repeated use of the butterfly basic cell of FIG. 2.
Figure 4:
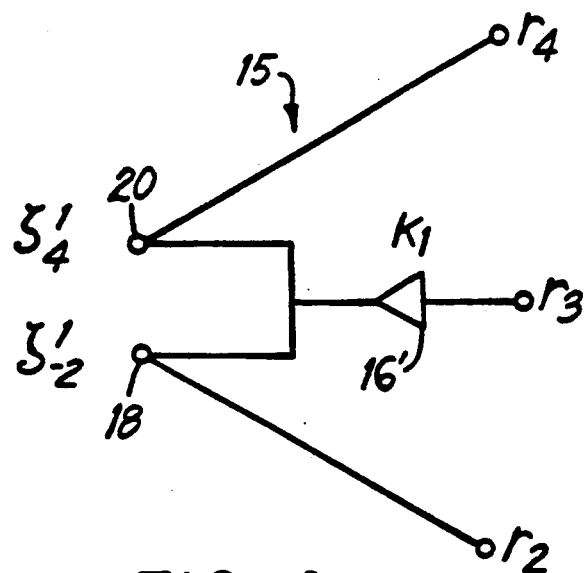
FIG. 4 is an illustration of a "reduced basic cell" which reduces the redundancies inherent in the butterfly basic cell structure of FIG. 2.

The substitution of a "reduced basic cell", involving one multiplication, for the "butterfly" or "lattice" basic cells, which involve two multiplications, would be desireable, but it is apparent from the foregoing discussion of FIG. 4 that even with an intuitive belief that such a reduction to the superlattice of FIG. 1 may be possible, the implementation of such a reduction, by a simple topological observation of the superlattice, is not straightforward. The following analysis provides an analytical tool to illustrate how the communication between "reduced basic cells", within a superlattice, is organized, and how the recovery of the PARCORS from reduced basic cells is possible. The analysis will begin with an example.

Let us define the value $\psi_i^{j+1}$ as the sum of two adjacent intermediate values of order j, in the superlattice of FIG. 1. For example:

$$\psi_{-2}^3 = \zeta_{-2}^2 + \zeta_{5}^2 \tag{1}$$

Using the lattice recursions for the $\zeta_i{}^j$, we can write:

$$\zeta_5{}^2 = \zeta_5{}^1 + k_2\zeta_{-3}{}^1, \text{ and} \quad (2)$$

$$\zeta_{-2}{}^2 = \zeta_{-2}{}^1 + k_2\zeta_4{}^1 \quad (3)$$

Consequently:

$$\psi_{-2}{}^3 = \zeta_5{}^1 + k_2\zeta_{-3}{}^1 + \zeta_4{}^1 k_2 + \zeta_{-2}{}^1$$
$$= (\zeta_5{}^1 + \zeta_{-3}{}^1) + (k_2 - 1)\zeta_{-3}{}^1 + (\zeta_{-2}{}^1 + \zeta_4{}^1) + (k_2 - 1)\zeta_4{}^1. \quad (4)$$

Defining:

$$\psi_{-2}{}^2 = \zeta_{-2}{}^1 + \zeta_4{}^1, \text{ and} \quad (5)$$

$$\psi_{-3}{}^2 = \zeta_{-3}{}^1 + \zeta_5{}^1, \quad (6)$$

equation (4) can be written:

$$\psi_{-2}{}^3 = \psi_{-2}{}^2 + \psi_{-3}{}^2 + (k_2-1)\zeta_{-3}{}^1 + (k_2-1)\zeta_4{}^1. \quad (7)$$

Since:

$$\zeta_{-3}{}^1 = r_4 + k_1 r_4, \text{ and} \quad (8)$$

$$\zeta_4{}^1 = r_4 + k_1 r_3, \quad (9)$$

equation (7) can be written:

$$\psi_{-2}{}^3 = \psi_{-2}{}^2 + \psi_{-3}{}^2 + (k_2-1)(k_1+1)\psi_{-3}{}^1, \quad (10)$$

where:

$$\psi_{-3}{}^1 = \zeta_4{}^0 + \zeta_{-3}{}^0 = r_3 + r_4. \quad (11)$$

This result can be generalized independently of the order selected.

By defining:

$$\psi_i{}^{m+1} = \zeta_i{}^m + \zeta_{m+1-i}{}^m, \quad (12)$$

the following relationship holds:

$$\psi_i{}^{m+1} = \psi_i{}^m + \psi_{i-1}{}^m + (k_m - 1)(k_{m-1}+1)\psi_{i-1}{}^{m-1}. \quad (13)$$

Using the basic lattice recursion (or the Schur recursive formula) each one of the quantities on the right hand side of (12) can be written:

$$\zeta_i{}^m = \zeta_i{}^{m-1} + k_m \zeta_{i-1}{}^{m-1}, \text{ and} \quad (14)$$

$$\zeta_{m+1-i}{}^m = \zeta_{m+1-i}{}^{m-1} + k_m \zeta_{-m-1+i}{}^{m-1}$$

or:

$$\zeta_{m+1-i}{}^m = \zeta_{m+1-i}{}^{m-1} + k_m \zeta_{i-1}{}^{m-1} \quad (15)$$

Consequently:

$$\psi_i{}^{m+1} = (\zeta_i{}^{m-1} + \zeta_{m-i}{}^{m-1}) + (k_m-1)\zeta_{m-i}{}^{m-1} + (\zeta_{m+i}{}^{m-1} + \zeta_{i-1}{}^{m-1}) + (k_m-1)\zeta_{i-1}{}^{m-1} \quad (16)$$

or:

$$\psi_i{}^{m+1} = \psi_i{}^m + \psi_{i-1}{}^m + (k_m-1)(\zeta_{m-i}{}^{m-1} + \zeta_{i-1}{}^{m-1}) \quad (17)$$

But:

$$\zeta_{m-i}{}^{m-1} = \zeta_{m-i}{}^{m-2} + k_{m-1}\zeta_{-1-m+i}{}^{m-2}$$
$$= \zeta_{m-i}{}^{m-2} + k_{m-1}\zeta_{m-i}{}^{m-2} \quad (18)$$

and:

$$\zeta_{i-1}{}^{m-1} = \zeta_{i-1}{}^{m-2} + k_{m-1}\zeta_{m-1-i+1}{}^{m-2}$$
$$= \zeta_{i-1}{}^{m-2} + \zeta_{m-i}{}^{m-2} \quad (19)$$

Substituting into equation (17) we obtain:

$$\psi_i{}^{m+i} = \psi_i{}^m + \psi_{i-1}{}^m + (k_m-1)(k_{m-1}+1)$$
$$(\zeta_{m-i}{}^{m-2} + \zeta_{m-1}{}^{m-2}) \quad (20)$$

But:

$$\zeta_{m-i}{}^{m-2} + \zeta_{i-1}{}^{m-2} = \psi_{i-1}{}^{m-1} \quad (21)$$

Therefore:

$$\psi_i{}^m = \psi_i{}^m + \psi_{i-1}{}^m + (k_m-1)(k_{m-1}+1)\psi_{i-1}{}^{m-1} \quad (22)$$

Defining:

$$\lambda_m{}^+ = -(k_m-1)(k_{m-1}+1),$$

equation (22) can be written:

$$\psi_i{}^{m+1} = \psi_i{}^m + \psi_{i-1}{}^m - \lambda_m{}^+ \psi_{i-1}{}^{m-1} \quad (23)$$

Figure 5A:
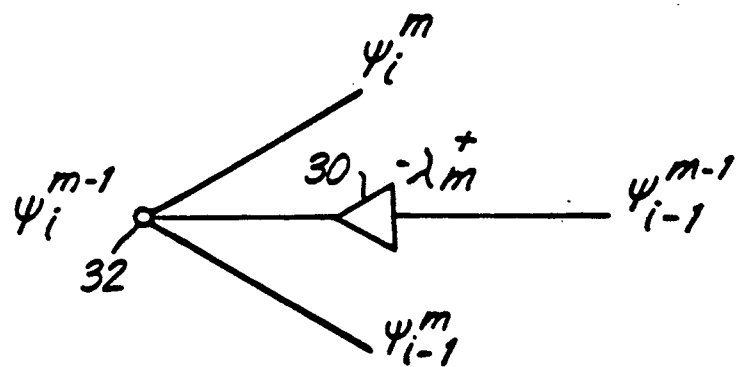
FIGS. 5A and 5B respectively illustrate "sparse basic cells" for the additive and subtractive sparse superlattice structures, in accordance with the present invention.

FIG. 5A is an illustration of an additive "sparse basic cell" ("SBC") which implements the above relationship. Specifically, the quantity $\psi_{i-1}{}^{m-1}$ is multiplied by $-\lambda_m{}^+$ in multiplier 30, and the product is added to the quantities $\psi_i{}^m$ and $\psi_{i-1}{}^m$, in adder 32, to produce the output $\psi_i{}^{m+1}$.

The SBC of FIG. 5A is called "additive", and the quantities λ are given a "+" superscript, to indicate that the output of the SBC represents the sum of the intermediate values of the superlattice of FIG. 1.

A complete processing structure, which will be called the "sparse superlattice", can be constructed with the repeated use of the SBC shown in FIG. 5A. Before discussing the sparse superlattice, however, the following will demonstrate that a structure operating with the sums of the intermediate values of the superlattice of FIG. 1 can provide information relating to the lattice predictor coefficients.

We will define $X_{04}{}^\psi$ as follows:

$$X_{04}^\psi = \frac{\psi_0{}^4}{\psi_0{}^3} = \frac{\zeta_4{}^3 + \zeta_0{}^3}{\zeta_3{}^2 + \zeta_0{}^2} = \frac{\zeta_4{}^3/\zeta_0{}^3 + 1}{\zeta_3{}^2/\zeta_0{}^3 + \zeta_0{}^2/\zeta_0{}^3} = \quad (24)$$

$$\frac{(1 - k_4)}{-k_3 \dfrac{\zeta_0{}^2}{\zeta_0{}^3} + \dfrac{\zeta_0{}^2}{\zeta_0{}^3}} = \frac{(1 - k_4)}{\dfrac{\zeta_0{}^2}{\zeta_0{}^3}(1 - k_3)} =$$

$$(1 - k_4)(1 + k_3) = \lambda_4{}^+$$

since:

$$\frac{\zeta_0{}^2}{\zeta_0{}^3}(1 - k_3) = (1 + k_3) \quad (25)$$

Equation (25) represents the well known total squared error computation in linear prediction.

From equation (24), generalized for an arbitrary order m, $k_m$ can be produced as follows:

$$k_m = 1 - \lambda_m{}^+/(1 + k_{m-1}) \quad (26)$$

Therefore, a recursive relationship exists for the processing of the lattice predictor coefficients, even when only the sums of the intermediate quantities $\zeta_i^j$ of the superlattice are available.

Equation (24), generalized for an arbitrary order m, also gives the following definition of $\lambda_m^+$:

$$\lambda_m^+ = \frac{\psi_0^m}{\psi_0^{m-1}} \qquad (27)$$

Thus, the quantities $\lambda_m^+$ are readily available, in a straightforward manner, from the quantities $\psi_0^m$ and $\psi_0^{m-1}$.

Figure 6:
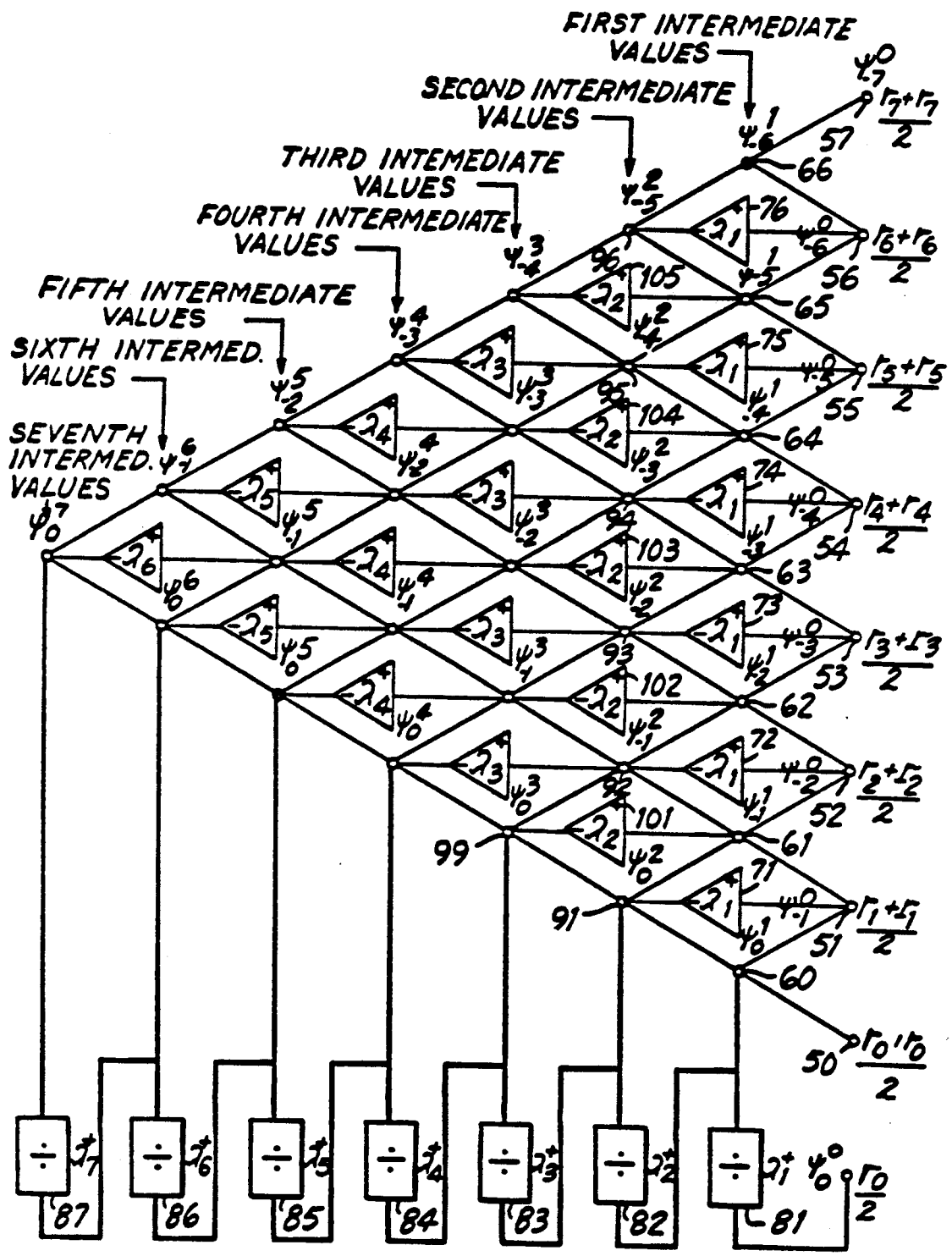
FIG. 6 illustrates the additive sparse superlattice processing structure in accordance with a first aspect of the present invention.

The sparse basic cell of FIG. 5A can be used as the basic building block for what will be called the "additive sparse superlattice", illustrated in FIG. 6. This structure can be used for linear prediction, and with additional circuitry, the lattice predictor coefficients can be produced. Also, the linear prediction coefficients can be obtained either from the lattice prediction coefficients, or from the quantities $\lambda_i^+$, with additional circuitry, described below.

With specific reference to FIG. 6, the autocorrelation coefficients $r_0$ to $r_7$, for a system having order 7, are applied to the inputs 50–57 of the sparse superlattice, as shown. Since the sums of the quantities are processed in the sparse superlattice, the sums of the autocorrelation coefficients are shown as being applied to the sparse superlattice, appropriately divided by two. For example, autocorrelation coefficient $r_0$ is applied to input 50, but is shown as the quantity $(r_0+r_0)/2$. Similarly, autocorrelation coefficients $r_1$ through $r_7$ are applied to inputs 51–57, respectively. With the exception of autocorrelation coefficients $r_0$ and $r_7$, each of the autocorrelation coefficients is applied to two adders (designated in the figures by circles) and one multiplier (designated in the figures by triangles); autocorrelation coefficient $r_1$ is applied to adders 60 and 61; autocorrelation coefficient $r_2$ is applied to adders 61 and 62; autocorrelation coefficient $r_3$ is applied to adders 62 and 63, autocorrelation coefficient $r_4$ to adders 63 and 64, and so on. Autocorrelation coefficients $r_1$ through $r_6$ are also applied to multipliers 71 through 76, respectively. Finally, autocorrelation coefficient $r_0$ is applied to adder 60, and autocorrelation coefficient $r_7$ is applied to adder 66. The sums produced at adders 60 through 66 yield first intermediate values $\psi_i^1$, where i=0 through −6.

Dividers 81 through 87 function to produce the quantities $-\lambda_m^+$ in accordance with equation (27), above. Autocorrelation coefficient $r_0/2$, shown as $\psi_0^0$, for the sake of conformance with the intermediate values, is applied to the divider 81 along with the intermediate value $\psi_0^1$, to produce the quantity $-\lambda_1^+$. Similarly, the intermediate value $\psi_0^2$ is divided by the intermediate value $\psi_0^1$ in divider 82, to produce the quantity $-\lambda_2^+$. The quantities $-\lambda_3^+$ through $-\lambda_7^+$ are produced in a similar manner, by dividers 83 through 87, respectively.

The quantities $-\lambda_m^+$ produced by the dividers 81–87, are applied to associated multipliers in accordance with the basic recursion of equation (23). Specifically, the quantity $-\lambda_1^+$ is applied to multipliers 71 through 76, the quantity $-\lambda_2^+$ is applied to multipliers 101 through 105, and so on, as shown in FIG. 6. Each of the multipliers shown in FIG. 6 functions to multiply the input value by a respective one of the quantities $-\lambda_m^+$. For example, the value $\psi_{-1}^0$ is multiplied by $-\lambda_1^+$ in multiplier 71, $\psi_{-1}^1$ is multiplied by $-\lambda_2^+$ in multiplier 101, and so on, as shown.

The output of each of the multipliers is added to the contents of the two adjacent adders, to produce the next order of intermediate values $\psi_i^j$. For example, the output of multiplier 71 is added to the outputs of adjacent adders 60 and 61, in adder 91, to produce a second intermediate value $\psi_0^2$; the output of multiplier 101 is added to the output of adjacent adders 91 and 92, in adder 99, to produce a third intermediate value $\psi_0^3$.

Adders 92 through 96 produce second intermediate variables $\psi_i^2$, where i=0 through −5, and the remaining intermediate values are produced as shown. In this manner, the additive sparse superlattice of FIG. 6 implements the basic additive sparse recursion of equation (23), using the additive sparse basic cell of FIG. 5A as a basic building block.

It will be noted that each of the intermediate values is related to the intermediate values of the original superlattice, shown in FIG. 1, by the following equation:

$$\psi_i^{j+1} = \zeta_i^j + \zeta_{j+1-i}^j \qquad (28)$$

It should also be noted that unlike the original superlattice of FIG. 1, each of the sparse basic cells of FIG. 5A is a "three order" structure, insofar as intermediate values having orders m−1, m and m+1 are involved in each basic cell. For example, the basic cell which includes multiplier 103 receives a first intermediate value from adder 63, and two second intermediate variables, in adders 93 and 94, to produce a third intermediate variable $\psi_{-2}^3$.

Since the double operations inherent in the superlattice of FIG. 1 do not exist, the sparse superlattice is minimal in terms of hardware complexity. For example, comparing the prior superlattice structure of FIG. 1 to the additive sparse superlattice structure of FIG. 6, it will be seen that the implementation of the superlattice structure of FIG. 1, for a system having order 7 (reduced from order 8 as shown in FIG. 1) requires some 42 multiplications and 42 additions, while the implementation of the additive sparse superlattice shown in FIG. 6 requires only 28 additions and 21 multiplications.

Figure 5B:
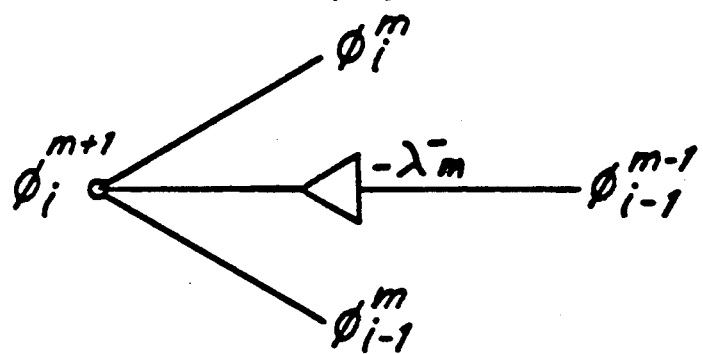
Figure 7:
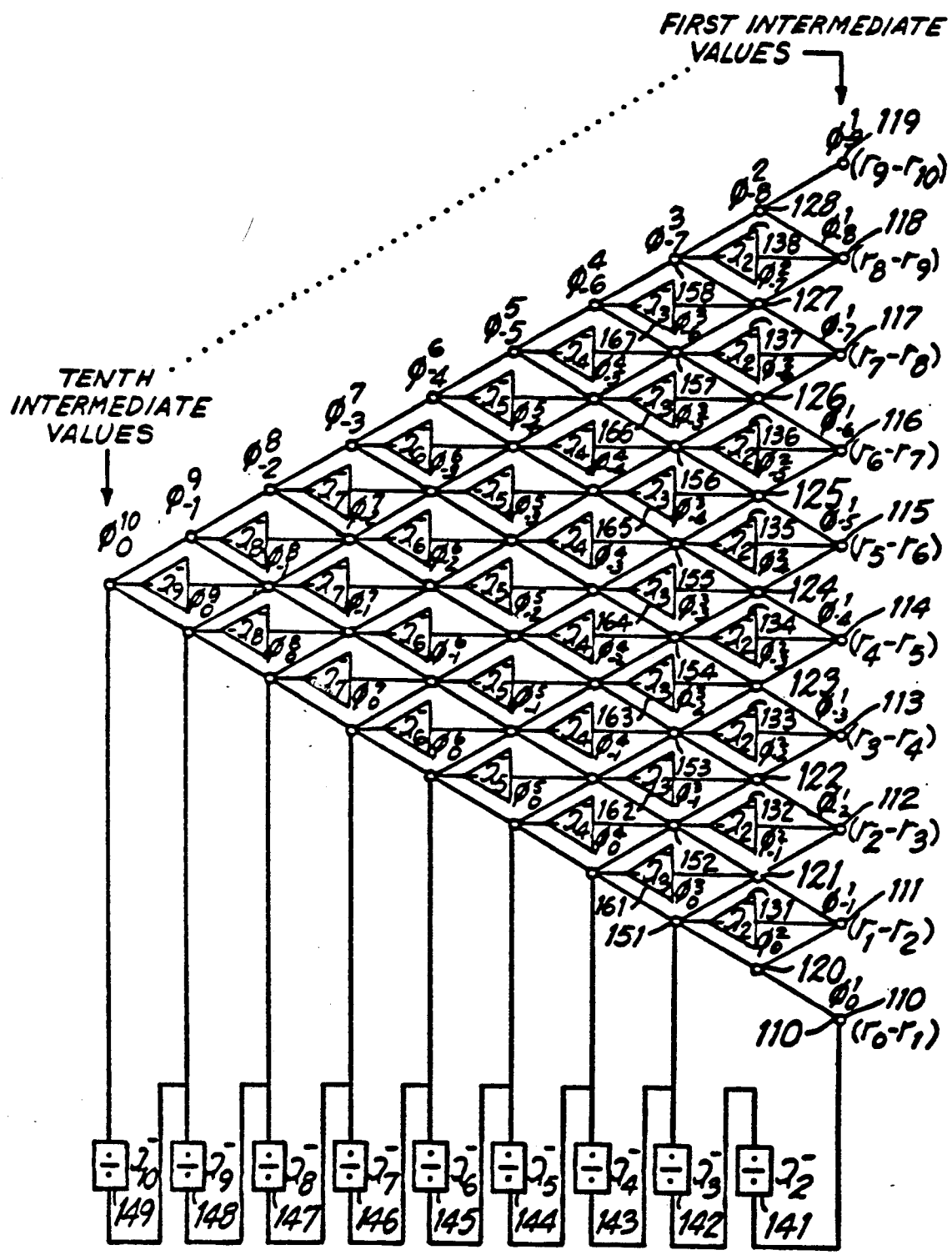
FIG. 7 illustrates the subtractive sparse superlattice processing structure in accordance with another aspect of the present invention.

As noted above, the intermediate values associated with the additive sparse superlattice of FIG. 6 consist of the sums of the intermediate values of the original superlattice, as set forth in equation (28), and the sparse superlattice of FIG. 6 is therefore called "additive". However, a subtractive sparse superlattice, in which the intermediate values consist of the differences between the intermediate values of the original superlattice, also exists. A subtractive sparse superlattice, for processing a signal having order 10, is shown in FIG. 7, and employs the subtractive SBC of FIG. 5B which is structurally the same as the additive SBC of FIG. 5A, but which receives different quantities.

In the subtractive sparse superlattice, the intermediate values $\phi_i^{j+1}$ are defined as follows:

$$\phi_i^{j+1} = \zeta_i^j - \zeta_{j+1-i}^j \qquad (29)$$

The basic subtractive sparse recursion is as follows:

$$\phi_i^{m+1} = \phi_i^m + \phi_{i-1}^m - \lambda_m^- \phi_{i-1}^{m-1} \qquad (30)$$

where:

$$\lambda_{m+1}^- = (1 + k_{m+1})(1 - k_m) = \frac{\phi_0^{m+1}}{\phi_0^m} \quad (31)$$

The structure shown in FIG. 7 is simplified over that of FIG. 6 due to the absence of the first coefficient $\lambda_1^-$. This can be seen with the example of $\phi_{-2}^2$:

$$\phi_{-2}^2 = \zeta_{-2}^1 - \zeta_4^1 = \zeta_{-2}^0 + k_1\zeta_3^0 - \zeta_4^0 - k_1\zeta_{-3}$$
$$= \zeta_{-2}^0 - \zeta_4^0 = r_4 - r_2 = (r_4 - r_3) - (r_2 - r_3) \quad (32)$$

Thus, unlike the additive sparse superlattice, there is no need to multiply the autocorrelation coefficients by the value $\lambda_1^-$ in order to obtain the first intermediate values $\phi_i^1$.

In FIG. 7, the differences between adjacent autocorrelation coefficients are applied to inputs 110–119. Specifically the value of $r_0$ minus $r_1$, corresponding to the first intermediate value $\phi_0^1$, is applied to input 110, the value of $r_1$ minus $r_2$, corresponding to the first intermediate value $\phi_{-1}^1$, is applied to input 111, the value of $r_2$ minus $r_3$, corresponding to first intermediate value $\phi_{-2}^1$, is applied to input 112, and so on, such that the remaining first intermediate values $\phi_i^1$, where i equals $-3$ to $-9$, are applied to inputs 113 through 119, respectively. The first intermediate values $\phi_{-1}^1$ through $\phi_{-8}^1$ are each applied to a multiplier and a pair of adders on either side of the multiplier. For example, the first intermediate value at input 111 is applied to multiplier 131 and to two adders 120 and 121, on either side of multiplier 131. Similarly, the value applied to input 112 is applied to multiplier 132 and to adders 121 and 122, on either side of multiplier 132, and so on. The values at the bounding inputs 110 and 119 are applied to single adders 120 and 128, respectively. At this point, the second intermediate values 100 $_i^2$, for i=0 through $-9$, are produced in adders 120–128, respectively.

The quantities $\lambda_{m+1}^-$ are produced in accordance with Equation (31) above. For example, the quantity $-\lambda_2^-$ is produced by dividing, in divider 141, the second intermediate value $\phi_0^2$, from adder 120, by intermediate value $\phi_0^1$, from input 110. In a manner similar to that described with reference to the additive sparse superlattice of FIG. 6, the remaining dividers 142–149 function to divide the intermediate values to produce an associated quantity $-\lambda_{m+1}^-$ in accordance with the above relationship.

Also in a manner similar to that described with reference to FIG. 6, the quantities $-\lambda_m^{31}$, produced by the dividers 141–149, are applied to associated multipliers, in accordance with the basic recursion of equation (30). Specifically the quantity $-\lambda_2^-$ is applied to multipliers 131–138, the quantity $-\lambda_3^-$ applied to multipliers 161–167, and so on, as shown in FIG. 7. Each of the multipliers shown in FIG. 7 functions to multiply the input value by a respective one of the quantities $-\lambda_m^-$. For example, the value $\phi_{-1}^1$ is multiplied by $-\lambda_2^-$ is multiplier 131, $\phi_{-2}^1$ is multiplied by $-\lambda_2^-$ in multiplier 132, and so on, as shown.

The output of each of the multipliers in FIG. 7, is added to the contents of the two adjacent adders, to produce the next order of intermediate values $\phi_i^j$. For example, the second intermediate values in adders 121 and 122 are added to the output of multiplier 132, in adder 152, to produce the third intermediate value $\phi_{-1}^3$, in accordance with the basic subtractive sparse recursion of equation (30) above. Similarly, the second intermediate values on either side of their associated multipliers 131–138 are added to the output of the associated multiplier, in adders 151–158, to produce respective third intermediate values $\phi_i^3$, where i=0, through $-7$. This process is continued, as shown, to produce the remaining intermediate values and quantities $\lambda_i^-$.

The Table below summarizes the basic relationships governing both the original superlattice and the additive and subtractive sparse superlattices:

TABLE

| | |
|---|---|
| $\zeta_i^m = \zeta_i^{m-1} + k_m \zeta_{m-i}^{m-1}$ | BASIC LATTICE RECURSION |
| $\zeta_i^m = r_i + \mathbf{a}_m^T \begin{pmatrix} r_{i-1} \\ r_{i-2} \\ \vdots \\ r_{i-m} \end{pmatrix}$ | DEFINITION OF INTERMEDIATE SUPERLATTICE VALUES |
| $\psi_i^{m+1} = \zeta_i^m + \zeta_{m+1-i}^m$ | DEFINITION OF ADDITIVE SPARSE INTERMEDIATE VALUES |
| $\psi_i^{m+1} = \psi_i^m + \psi_{i-1}^m - \lambda_m^+ \psi_{i-1}^{m-1}$ | BASIC ADDITIVE SPARSE RECURSION |
| $\phi_i^{m+1} = \zeta_i^m - \zeta_{m+1-i}^m$ | DEFINITION OF SUBTRACTIVE SPARSE INTERMEDIATE VALUES |
| $\phi_i^{m+1} = \phi_i^m + \phi_{i-1}^m - \lambda_m^- \phi_{i-1}^{m-1}$ | BASIC SUBTRACTIVE SPARSE RECURSION |
| $\lambda_{m+1}^+ = (1 - k_{m+1})(1 + k_m) = \dfrac{\psi_0^{m+1}}{\psi_0^m}$ | DEFINITION OF THE PARAMETERS OF THE ADDITIVE SPARSE |
| $\lambda_{m+1}^- = (1 + k_{m+1})(1 - k_m) = \dfrac{\phi_0^{m+1}}{\phi_0^m}$ | DEFINITION OF THE PARAMETERS OF THE SUBTRACTIVE SPARSE |
| $\zeta_m^- = \dfrac{\psi_i^{m+1} + \phi_i^{m+1}}{2}$ $\zeta_{m+1-i}^m = \dfrac{\psi_i^{m+1} + \phi_i^{m+1}}{2}$ | OTHER RELATIONSHIPS BETWEEN THE SUPERLATTICE AND ITS TWO SPARSE FORMS |

The additive and subtractive sparse superlattices introduce the new parameters $\lambda_i^+$ and $\lambda_i^-$, which are related to the lattice predictor coefficients $k_i$ and the linear predictor coefficients $a_i$. Therefore, if $\lambda_i^+$ or $\lambda_i^-$ are produced, the lattice and/or linear predictor coefficients $k_i$ and $a_i$ can also be produced. Like $k_i$, which has an absolute value bounded by unity, the values of $\lambda_i^+$ and $\lambda_i^-$ are bounded by the values 0 and 4. That is:

$$0 \leq \lambda_i^+ \leq 4$$

$$0 \leq \lambda_i^- \leq 4 \quad (33)$$

The sparse superlattices of FIGS. 6 and 7 illustrate the processing structures involved in producing the quantities $\lambda_i^+$ and $\lambda_i^-$. As implemented, however, the entire structures illustrated therein do not necessarily exist, as a whole, at any particular point in time. Rather, because of the recursive nature of the sparse superlattices, the various adders, multipliers and dividers can be implemented by a relatively small number of such elements, which are shared in time, the outputs of the elements being recursively fed back to the appropriate inputs thereof, to produce the entire superlattice structures.

Like the original superlattice structures disclosed in the four copending applications, identified above, the additive and the subtractive sparse superlattices can be implemented, in this recursive manner, in a fully parallel, fully sequential or partitioned parallel implementation. In the fully parallel implementation, in the system of FIG. 7, a total of nine adders and eight multipliers would be provided, corresponding to adders 120 through 128 and multipliers 131 through 138, so that the quantities applied to the inputs 110 through 119 could be processed, in parallel, to produce the second and third intermediate values, which would be fed back to a subset of the same adders and multipliers, to recursively produce the fourth intermediate values, and so on.

In the fully sequential implementation, a single multiplier, and at least one adder would be provided, and the second intermediate values would be produced sequentially, until all the second intermediate values were produced. The multiplier then would function to produce the third intermediate values, one after another, and so on, until all intermediate values were produced.

Figure 8:
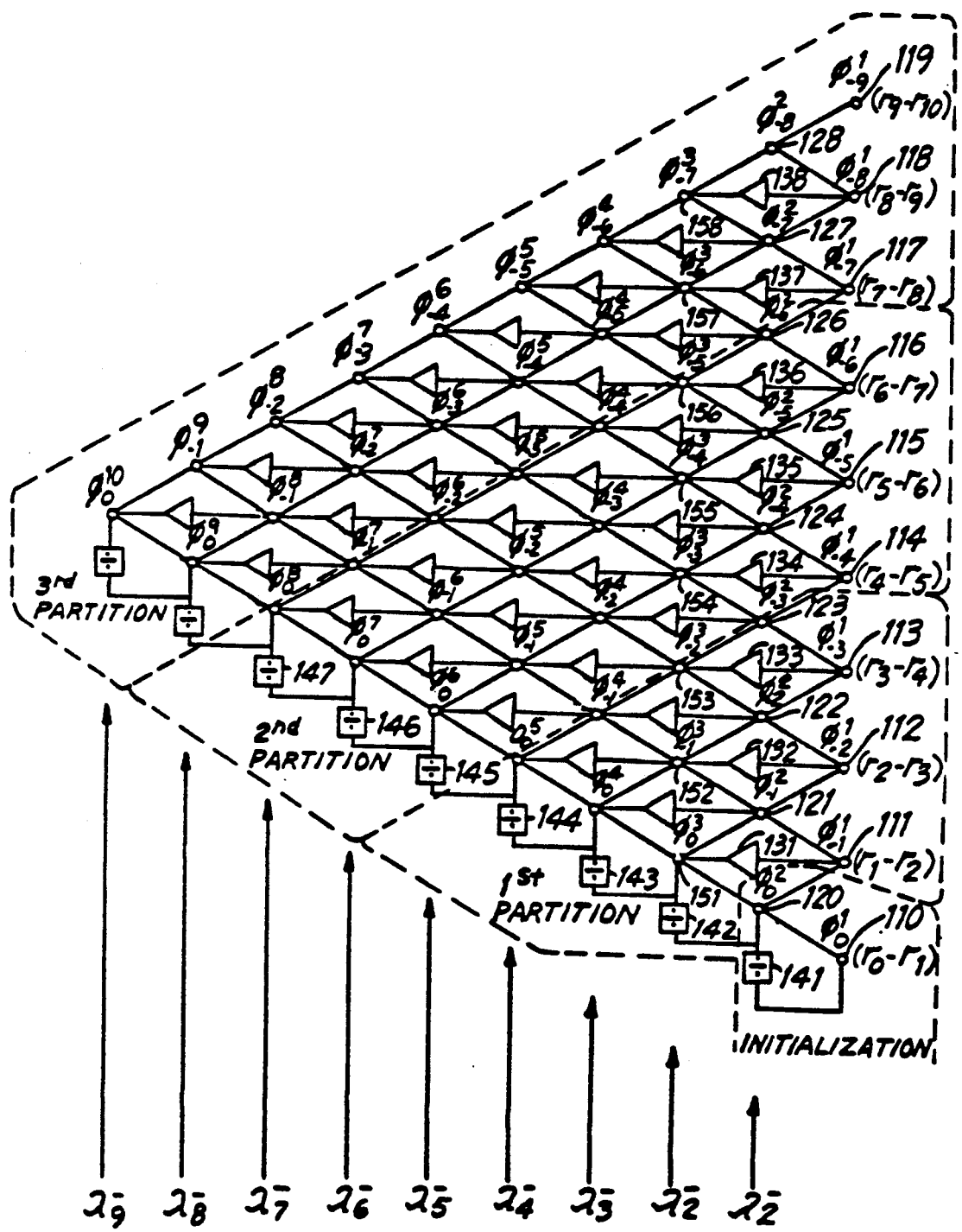
FIG. 8 illustrates a parallel partitioned implementation of the subtractive sparse superlattice.

FIG. 8 is an illustration of the processing performed by the partitioned parallel implementation of the subtractive sparse superlattice. The partitioned parallel implementation was chosen for this example insofar as it combines the elements of the fully parallel and the fully sequential implementations. In view of the following discussion, and specific example, the fully parallel and fully sequential implementations will be readily apparent to those skilled in the art.

With reference to FIG. 8, three multipliers 131, 132 and 133, and three adders 121, 122 and 123 are provided. Initialization is first performed to determine the second intermediate value $\phi_0^2$ and the value of $-\lambda_2^-$ by adding the values of $\phi_0^1$ and $\phi_{-1}^1$ in adder 120 (which, in actuality, is one of the adders 121 through 123, as explained below), and by dividing the sum by $\phi_0^1$ in divider 141. The intermediate value $\phi_0^2$ is stored for later use in the first partition. The first intermediate values $\phi_{-1}^1$, $\phi_{-2}^1$ and $\phi_{-3}^1$ are then applied to the adders 121 through 123, to produce the second intermediate values $\phi_{-1}^2$, $\phi_{-2}^2$ and $\phi_{-3}^2$. These first intermediate values are also applied to respective ones of the three multipliers 131 through 133, the outputs of which are then added to the second intermediate variables on either side of each respective multiplier, in adders 151-153 (which, in actuality, are adders 121-123, as explained below), to produce third intermediate values $\phi_0^3$, $\phi_{-1}^3$ and $\phi_{-2}^3$. At this point, $-\lambda_3^-$ can be produced by divider 142, (which, like dividers 143 and 144, is in actuality divider 141). Two of the second intermediate values, $\phi_{-1}^2$ and $\phi_{-2}^2$, are applied to multipliers, and the respective products are added to the adjacent two third intermediate values to produce fourth intermediate variables $\phi_0^4$ and $\phi_{-1}^4$, as shown. One of the third intermediate values, $\phi_{-1}^3$ is then applied to one of the multipliers and the product is added to the two fourth intermediate variables to produce one of the fifth intermediate values $\phi_0^5$. The intermediate values along the border of the first partition, namely $\phi_{-3}^2$, $\phi_{-2}^3$, $\phi_{-1}^4$ and $\phi_0^5$, are stored for later use in the second partition.

At this point the first partition is completed, and the processing of the second partition begins by applying the first intermediate values $\phi_{-4}^1$, $\phi_{-5}^1$ and $\phi_{-6}^1$ to the three adders, designated in FIG. 8 as 124, 125 and 126 (but which in actuality are adders 121-123) and to the three multipliers, designated in the figure as 134, 135 and 136, (but which in actuality correspond to multipliers 131-133). In this manner, the intermediate variables are generated through the second partition, the three adders and multipliers functioning to cut through the sparse superlattice in sequential partitions, to provide the processing structure of the entire sparse superlattice. The three adders and multipliers in this example function in parallel, but process each of the partitions sequentially. In this manner, any available number of adders and multipliers can be employed to process a signal having any order, the adders and multipliers functioning in parallel to process each partition, with the required number of partitions being performed in sequence, until the entire sparse superlattice is completed.

Figure 9:
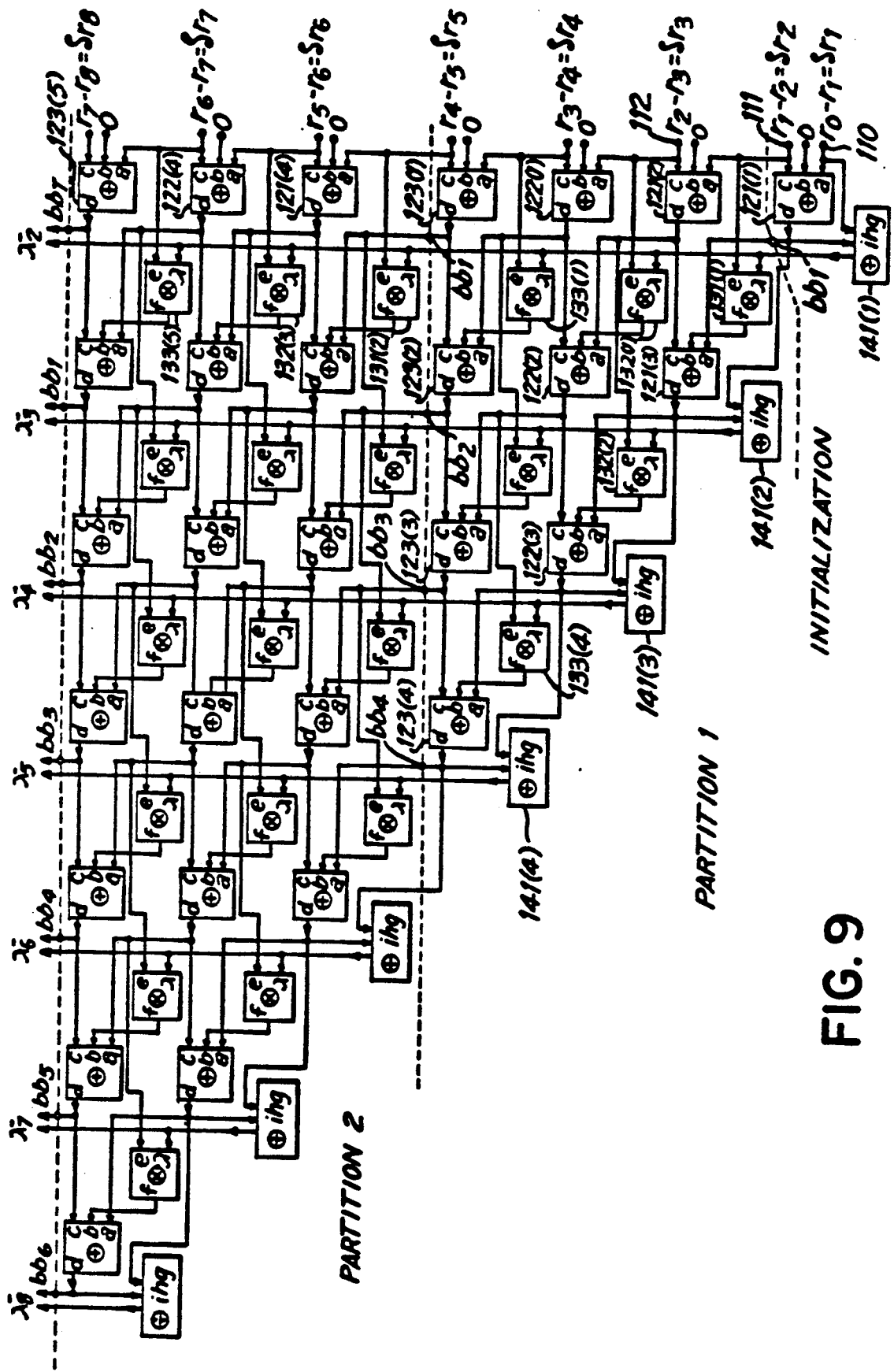
FIG. 9 is a diagram illustrating the signal flow through the subtractive sparse superlattice, using a partitioned partitioned implementation.

The signal flow through the sparse superlattice, using a parallel partition implementation, will be explained in more detail with reference to FIG. 9 which illustrates a sparse superlattice implementation for processing a signal having order 8. In this figure, three adders 121, 122 and 123, three multipliers 131, 132 and 133, and a divider 141, corresponding to the adders, multipliers and dividers of FIGS. 7 and 8 are shown, with an additional notation in parentheses following each reference number, indicating the number of times each element has been used, up to that point, within the processing structure. For example, reference numeral 122(2) refers to the second use of adder 122, reference numberal 122(3) refers to the third use of adder 122, and so on. This notation differs from that of FIGS. 7 and 8 since the adders, multipliers and dividers shown in positions downstream of the adders 121 through 123, multipliers 131 through 133 and divider 141, do not actually exist, as noted above, but rather are implemented by the original elements, through the appropriate use of feedback, to be described in detail below.

Each of the adders 121-123 has three inputs, a, b and c, and an output d equal to the sum of the inputs. Each of the multipliers 131-133 has two inputs, $\lambda$ and e, and an output f equal to the product of $\lambda$ and e, and the divider 141 has two inputs g and h, and an output i equal to $-h/g$.

For initialization, the quantity $r_0-r_1$, herein defined as $\delta r_1$, and the quantity $r_1-r_2$, defined as $\delta r_2$, are applied to a and c inputs of adder 121(1), the middle input, b, being set to zero, to produce the quantity d, which is stored, in a bordering buffer, denoted in the figure by "bb$_1$". The quantity $\delta r_1$ is also applied to the g input of divider 141(1), and the quantity d from adder 121(1) is applied to the h input of the divider, to produce the quantity i, corresponding to $-\lambda_2^-$. The quantity $-\lambda_2^-$ is stored in a $\lambda$ buffer, for later use.

After initialization, adder 121(2), in its second operation (indicated by the parenthetical 2 appended to the reference numeral) receives the quantity $\delta r_2$ at its a input and the quantity $\delta r_3$, corresponding to the quantity $r_2-r_3$, at its c input. As before, the b input is set to zero. Similarly, the quantity $\delta r_3$ is applied to the a input of adder 122(1) (which is performing its first operation) while the quantity $\delta r_4$, corresponding to $r_3-r_4$, is applied to the c input of adder 122(1), the b input being set to zero. Finally, the quantity $\delta r_4$ is applied to the a input of adder 123(1) (performing its first operation), while its c input receives the quantity $\delta r_5$, corresponding to the quantity $r_4-r_5$, the b input again being set to zero. The adders 121(2), 122(1) and 123(1) produce outputs d, which are appropriately fed back to the inputs of the adders and multipliers, the output of adder 123(1) also being stored in the bordering buffer, for later use in the second partition.

Simultaneously with the operations being performed by adders 121(2), 122(1) and 123(1), the value of $\lambda_2^-$ is applied to the multipliers 131(1), 132(1) and 133(1), at the $\lambda$ inputs thereto. Multiplier 131(1) receives the quantity $\delta r_2$, multiplier 132(1) receives $\delta r_3$ and multiplier 133(1) receives $\delta r_4$, at their respective e inputs.

The d output of adder 121(1), which was stored in a bordering buffer (bb$_1$), is fed back to the a input of the same adder, denoted by 121(3), the f output of multiplier 131(1) is fed back to the b input of adder 121(3), and the d output of the same adder 121(2) is fed back to its c input, of adder 121(3). The d output of adder 121(2) is also applied to the a input of adder 122(2), the output of multiplier 132(1) is applied to the b input of adder 122(2), and the d output of 122(1) is fed back to its c input, of adder 122(2). Continuing, the d output of adder 122(1) is applied to the a input of adder 123(2), the f output of multiplier 133(1) is applied to the b input of adder 123(2), and the d output of adder 123(1) is fed back to its c input, of adder 123(2), which in turn produces an output d which is stored in the bordering buffer for use in the second partition.

At this point, the d output of adder 121(3) is applied to the h input of divider 141(2), and the d output from adder 121(1) is retrived from storage and applied to the g input of divider 141(2), to produce the quantity $-\lambda_3^-$, which is stored in the $\lambda$ buffer for later use. The quantity $-\lambda_3^-$ is then applied to only two multipliers 132(2) and 133(2), as the partition cuts through the sparse superlattice, as shown in FIG. 8. Likewise, only two adders 122(3) and 123(3) are employed to produce d outputs, the d output of adder 123(3) being stored in the bordering buffer for later use, and the value $-\lambda_4^-$, produced in divider 141(3), is stored in the $\lambda$ buffer. In the next iteration, only a single multiplier 133(4), and a single adder 123(4) is employed to produce a single d output, which is applied to the bordering buffer for later use, and to the divider 141(4) for the production of the quantity $\lambda_5^-$, which is stored in the $\lambda$ buffer for later use. At this point, the first partition is complete.

The second partition begins with the application of $\delta r_5$ to the a input of adder 121(4), and the application of $\delta r_6$, corresponding to $r_5-r_6$, to the c input of adder 121(4), the b input having been set to zero. Similarly, the quantities $\delta r_6$ and $\delta r_7$ are applied to the a and c inputs of adder 122(4), the quantities $\delta r_7$ and $\delta r_8$ are applied to the a and c inputs of adder 123(5), and the b inputs of adders 122(4) and 123(5) are set to zero. The adders 131(2), 132(3) and 133(5) receive the quantity $\lambda_2^-$ from the $\lambda$ buffer, and the processing continues, as shown, until the second partition, and in the example shown in FIG. 9, the entire sparse superlattice, is complete.

One example of an implementation of the processing structure shown in FIG. 9, will now be described with reference to FIG. 10. Three adders 201-203 and three multipliers 204-206 are provided, and may be formed by three processors, each having an adder and multiplier, although such an arrangement is not required. Furthermore, even though the adders are shown as being separate, in a hardware sense, from the multipliers, a single hardware element may perform both addition and multiplication functions, if desired. Also, although implemented using three adders and multipliers, greater or lesser numbers of such elements can be used, as desired.

The adders 201-203, hereinafter called the "top", "middle" and "bottom" adders, respectively, each have three input registers, a, b and c, and function to add the contents of the input registers. The adders also have an output register d for storing the sum of the contents of the input registers. The multipliers 204-206, hereinafter called "top", "middle" and "bottom" multipliers, respectively, each have two input registers $\lambda$ and e and function to multiply the contents of the input registers. The multipliers also have an output register f for storing the product.

A $\lambda$ buffer 212 is provided for receiving, storing and transmitting values of $\lambda_i^-$, via $\lambda$ buffer bus 210. Similarly, a $\delta r$ buffer 216 is provided for receiving, storing and transmitting values of $\delta r_i$, via $\delta r$ bus 214, and a bordering buffer 220 functions to receive, store and transmit intermediate values, via bordering buffer bus 218. Finally, a divider 222 has two input registers g and h, and output register, i, and functions to provide the quotient $-h/g$, and store it in the i register.

The $\lambda$ buffer 212 receives as its only input the output of the i register in divider 222 by way of $\lambda-$ bus 210. The $\lambda$ buffer 212 provides an input to the $\lambda$ registers of the multipliers 204-206. The $\delta r$ buffer receives as its inputs the quantities $r_0-r_1$, $r_1-r_2$, etc., as shown in FIG. 9, and provides inputs to the a, b and c registers of the adders 201-203, by way of the $\delta r$ bus 214. The bordering buffer 220 receives an input from the d register of the top adder 201, by way of bordering buffer bus 218, and provides inputs to the e register of the bottom multiplier 206, and to the a register of the bottom adder 203, also by way of the bordering buffer bus 218.

The output of the d registers of each of the adders 201 through 203 is applied as an input to its respective c register. The d register of the bottom adder 203 also provides an input to the a register of the middle adder 202, the e register of the middle multiplier 205, and the g and h registers of the divider 222. The d register of the middle adder 202 in a similar manner, provides an input to the a register of the top adder 201, the e register of the top multiplier 204, and to the g and h registers of the divider 222. The d register of the top adder 201 provides a third input to the g and h registers of the divider 222.

Finally, the f register of the bottom multiplier 206 provides an input to the b register of the bottom adder 203, the f register of the middle multiplier 205 provides an input to the b register of the middle adder 202, and the f register of the top multiplier 204 provides an input to the b register of the top adder 201.

Figure 13:
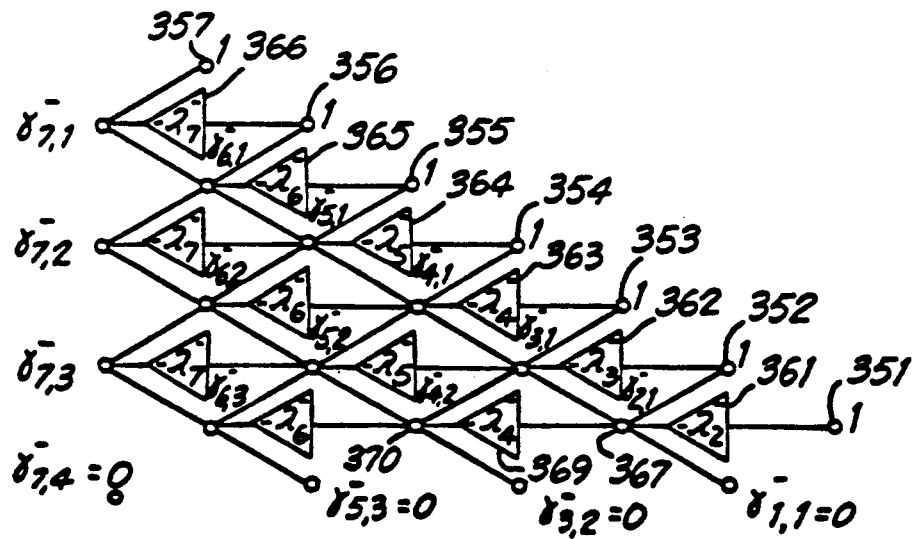
FIG. 13 is an illustration of a side-fed sparse superlattice, for use with the subtractive sparse superlattice, for producing the constant group delay predictor.

In describing the operation of the implementation shown in FIG. 13, the following notation will be used:

| ADDERS | | |
|---|---|---|
| BA: bottom adder | a(.) b(.) | registers of the adder (.) example: |
| MA: middle adder | c(.) | a (MA): the a-register of |
| TA: top adder | d(.) | the middle adder. |
| MULTIPLIERS | | |
| BM: bottom multiplier | e(.) | registers of the multiplier (.), example: |

| -continued | |
|---|---|
| MM: middle multiplier | λ(.) |
| TM: top multiplier | f(.) |
| | λ (TM): λ register of the top multiplier. |

OTHER NOTATIONS $bb_i$: i-th location of the bordering buffers
$\lambda_i^-$: i-th location of the $\lambda^-$ - buffer
$\delta r_i$: i-th location of the $\delta r$ - buffer
C [element 1, element 2, element 3; p, l]: concurrent operation of element 1, element 2, element 3 belonging to the partition p and level l.
D (p, l): Division at partition p and level l.
location 1 → location 2:  data transfer; the contents of location 1 are transferred to location 2. Locations 1 and 2 may be processor registers or buffer locations.

Examples of transfers:

$\delta r_4$ → b(MA): the contents of the 4th location of the $\delta r$ - buffer are transferred to the b-resister of the middle adder.
location 1 → (location 2, ..., location m): the contents of location 1 are transferred to locations 2, ..., m transfer 1
.
.
transfer m
} : The transfers 1, ..., m may occur in any order, even simultaneously, if possible transfer 1
.
.
transfer m
} : The transfers 1, ..., m must occur one after the other in a strictly sequential manner.

A combination of the last two cases can occur during the same phase. Example:

transfer 1
transfer 2
transfer 3
transfer 4
transfer 5
} : Order of transfers
1: transfer 1, 2: transfer 2, 3: transfer 3 and 4, or 4 and 3, or simultaneously, 4: transfer 5

Figure 10:
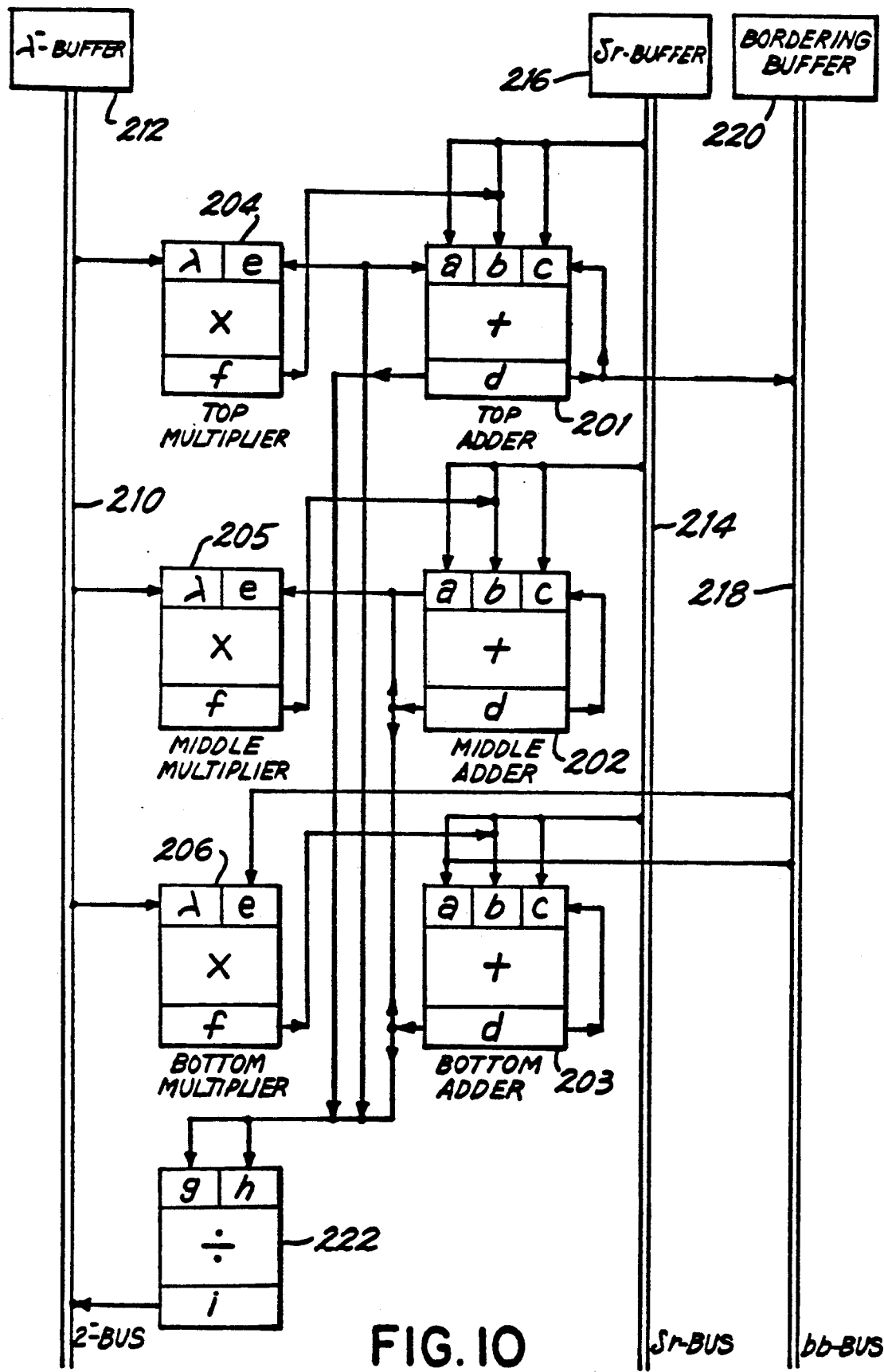
FIG. 10 is a schematic diagram illustrating a hardware implementation of the subtractive sparse superlattice of FIGS. 8 and 9.

The operation of the implementation of FIG. 10 is as follows:

| Initialization | |
|---|---|
| Phase 1: | $\delta r_2$ → c(BA) |
| | 0 → b(BA) |
| | $\delta r_1$ → (a(BA), g) |
| Phase 2: | C [BA; 0, 1] |
| Phase 3: | d(BA) → (bb$_1$, h) |
| Phase 4: | D [0,1] |
| Phase 5: | i → ($\lambda_2^-$, g) |
| Partition 1 | |
| Phase 6: | 0 → (b(BA), b(MA), b(TA)) |
| | $\delta r_2$ → (e(BM), a(BA)) |
| | $\delta r_3$ → (c(BA), e(MM), a(MA)) |
| | $\delta r_4$ → (c(MA), e (TM), a(TA)) |
| | $\delta r_5$ → c(TA) |
| Phase 7: | C [BA, MA, TA; 1, 1] |
| Phase 8: | d(BA) → (c(BA), a(MA)) |
| | d(MA) → (c(MA), a(TA)) |
| | d(TA) → (c(TA), bb$_1$) |
| Phase 9: | $\lambda_2^-$ → ($\lambda$(BM)), $\lambda$(MM), $\lambda$(TM) |
| Phase 10: | C [BM, MM, TM; 1,1] |
| Phase 11: | f(BM) → b(BA) |
| | f(MM) → b(MA) |
| | f(TM) → b(TA) |
| | d(BA) → e(MM) |
| | d(MA) → e(TM) |
| Phase 12: | C [BA, MA, TA; 1,2] |
| Phase 13: | d (BA) → (h, a(MA)) |
| | d(MA) → (c(MA), a(TA)) |
| | d(TA) → (c(TA), bb$_2$) |
| Phase 14: | D [1,2] |
| Phase 15: | i → ($\lambda_3^-$, $\lambda$(MM), $\lambda$(TM)) |
| Phase 16: | C [BM, MM; 1,2] |
| Phase 17: | f(MM) → b(MA) |
| | f(TM) → b(TA) |

| -continued | |
|---|---|
| | d(MA) → e(TM) |
| Phase 18: | C [MA, TA; 1,3] |
| Phase 19: | d(MA) → (h, a(TA)) |
| | d(TA) → (C(TA), bb$_3$) |
| Phase 20: | D [1,3] |
| Phase 21: | i → ($\lambda_4$, $\lambda$(TM)) |
| Phase 22: | C [TM; 1,4] |
| Phase 24: | f(TM) → b(TA) |
| Phase 25: | C [TA; 1,4] |
| Phase 26: | d(TA) → (g, bb$_4$) |
| Phase 27: | D [1,4] |
| Phase 28: | i → ($\lambda_5^-$, g) |
| Partition 2 | |
| Phase 29: | $\delta r_5$ → (a(BA), e(BM)) |
| | $\delta r_6$ → (c(BA), a(MA), e(MM)) |
| | $\delta r_7$ → (c(MA), a(TA), e(TM)) |
| | $\delta r_8$ → c(TA) |
| | 0 → b(BA), b(MA), b(TA) |
| Phase 30: | C [BA, MA, TA; 2,1] |
| Phase 31: | d(BA) → (c(BA), a(MA)) |
| | d(MA) → (c(MA), a(TA)) |
| | d(TA) → (c(TA), bb$_7$) |
| | bb$_1$ → a(BA) |
| | $\lambda_2^-$ → ($\lambda$(BM), $\lambda$(MM), $\lambda$(TM)) |
| Phase 32: | C [BM, MM, TM; 2,1] |
| Phase 33: | f(BM) → b(BA) |
| | f(MM) → b(MA) |
| | f(TM) → b(TA) |
| | bb$_1$ → e(BM) |
| | d(BA) → e(MM) |
| | d(MA) → e(TM) |
| Phase 34: | C [BA, MA, TA; 2,2] |
| Phase 35: | d(BA) → (c(BA), a(MA)) |
| | d(MA) → (c(MA), a(TA)) |
| | d(TA) → (c(TA), bb$_1$) |
| | bb$_2$ → a(BA) |
| | $\lambda_3^-$ → ($\lambda$(BM), $\lambda$(MM), $\lambda$(TM)) |

Those skilled in the art will appreciate the continuation of partition 2 in view of the above discussion. Also, although the above example implements the subtractive sparse superlattice, implementations for the additive sparse structure of FIG. 6 will be apparent to those skilled in the art, in view of the above discussion.

Once either the quantitites $\lambda_i^-$ or $\lambda_i^+$ are obtained, the production of the lattice predictor coefficients (PARCOR's) is straightforward using the relevant relationships shown in the above table, which are reproduced here for the sake of convenience:

$$\lambda_{m+1}^+ = (1 - k_{m+1})(1 + k_m) \tag{34}$$

$$\lambda_{m+1}^- = (1 + k_{m+1})(1 - k_m) \tag{35}$$

thus:

$$k_{m+1} = 1 - (\lambda_{m+1}^+/(1 + k_m)) \tag{36}$$

or:

$$k_{m+1} = (\lambda_{m+1}^-/(1 - k_m)) - 1 \tag{37}$$

Therefore, production of the lattice predictor coefficients can be achieved by using additional phases of the hardware illustrated in FIG. 10, or with additional hardware, if desired.

Other processes which can be implemented using one of the sparse superlattices are (i) the production of the linear prediction coefficients from the PARCOR's, (ii) the production of lattice filter coefficients, by employing the structures disclosed in Ser. No. 021,256, (iii) or the production of linear filter coefficients, by employing the structures disclosed in Ser. No. 084,929.

In addition to the above, the additive and subtractive sparse superlattice structures readily lend themselves to the production of linear phase predictors and constant group delay predictors. Specifically, a "unit side-fed" sparse superlattice, shown in FIG. 11, produces the linear phase predictor $\gamma^+$ based on the quantities $\lambda_i^+$ produced from the additive sparse superlattice of FIG. 6, as follows:

$$\gamma^+ = a + Ja \quad (38)$$

Figure 11:
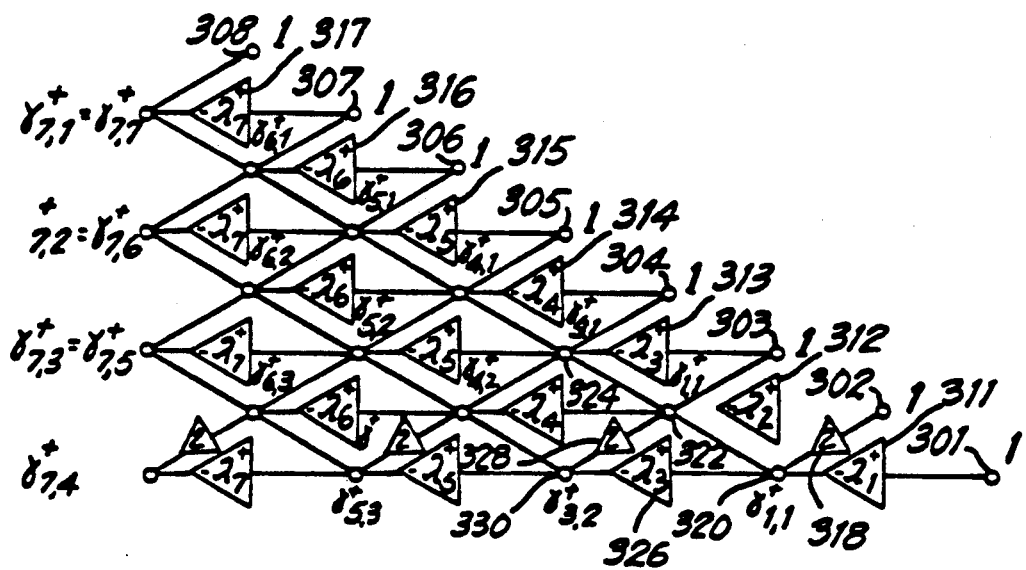
FIG. 11 is an illustration of a side-fed sparse superlattice, for use with the additive sparse superlattice, for producing a linear phase predictor.

The linear phase predictor has the following property:

$$\gamma^+ = J\gamma^+ \quad (39)$$

so that for a predictor of order 7, as in FIG. 11, $$\gamma_{7,1}^+ = \gamma_{7,7}^+$$
$$\gamma_{7,2}^+ = \gamma_{7,6}^+$$
$$\gamma_{7,3}^+ = \gamma_{7,5}^+ \quad (40)$$

The unit side-fed sparse superlattice of FIG. 11 applies unity to a series of side-fed inputs 301 through 308. Each of the unity inputs, except for the uppermost, 308, is applied to an associated multiplier 311 through 317, which functions to multiply the input by quantities $-\lambda_1^+$ through $-\lambda_7^+$, respectively, which quantities were derived from the additive sparse superlattice.

The unity input 302 is multiplied by 2 in multiplier 318 and the result is added to the output of multiplier 311, in adder 320, to produce the first intermediate value $\gamma_{1,1}^+$. The unity input 303 is added to the output of multiplier 312, and to the first intermediate value $\gamma_{1,1}^+$, in adder 322, to produce a second intermediate value $\gamma_{2,1}^+$. The unity input 304 is added to the output of multiplier 313, and to the second intermediate value $\gamma_{2,1}^+$, in adder 324, to produce a third intermediate value $\gamma_{3,1}^+$. The first intermediate value $\gamma_{1,1}^+$ is multiplied by $-\lambda_3^+$ in multiplier 326. The second intermediate value $\gamma_{2,1}^+$ is multiplied by 2 in multiplier 328 and the product is added to the output of multiplier 326, in adder 330, to produce the third intermediate value $\gamma_{3,2}^+$. This processing structure is repeated, feeding the unity values into the side of the sparse superlattice structure, until the seventh-order values $\gamma_{7,i}^+$ are produced.

Figure 12:
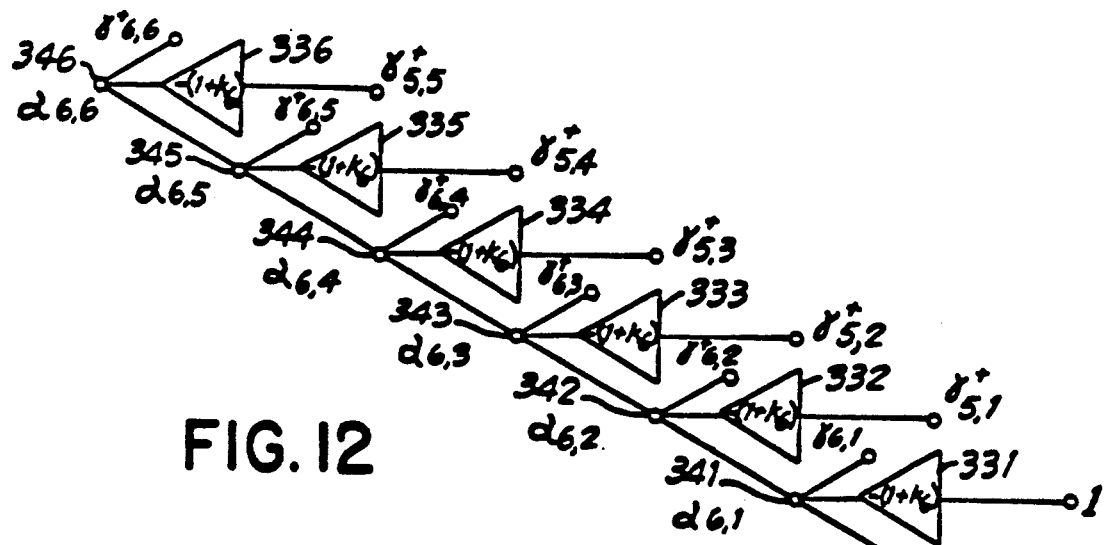
FIG. 12 illustrates a processing structure for producing a linear predictor, based on the production of the linear phase prediction coefficients by the structure of FIG. 11.

If desired, the linear predictor coefficients can be computed directly from the unit side-fed structure of FIG. 11. FIG. 12 illustrates a simple processing structure for producing the linear predictor a, for a system having order 6, from the sixth intermediate values $\gamma_{6,i}^+$, where i equals 1 through 6 ($\gamma_{6,6}^+ = \gamma_{6,1}^+$; $\gamma_{6,5}^+ = \gamma_{6,2}^+$, $\gamma_{6,4}^+ = \gamma_{6,3}^+$) and the fifth intermediate values $\gamma_{5,j}$, where j equals 1 through 5, produced from a side-fed sparse superlattice such as that shown in FIG. 11. Specifically, 6 multipliers 331 through 336 are provided and function to multiply the input value by the quantity $-(1+k_6)$, which is produced in accordance with equations (36) or (37). The value applied to the first multiplier 331 is unity, and the values applied to the remaining multipliers 332 through 336 are $\gamma_{5,1}^+$ through $\gamma_{5,5}^+$, respectively. Six adders 341 through 346 are each associated with one of the multipliers 331 through 336. The first adder 341 receives the output of the first multiplier 331, $\gamma_{6,1}^+$ and unity. These values are added in adder 341 to produce the first linear prediction coefficient $a_{6,1}$. The outputs of multiplier 332, adder 341 and $\gamma_{6,2}^+$ are added in adder 342 to produce the linear prediction coefficient $a_{6,2}$. The remaining adders 343 through 346 each receive the output of the previous adder along with the output of the associated multiplier and associated value of $\gamma_{6,i}^+$, to thereby yield the linear prediction coefficients $a_{6,3}$ through $a_{6,6}$.

FIG. 13 illustrates another unit side-fed sparse superlattice, which utilizes the values generated by the subtractive sparse superlattice of FIG. 7, to produce the constant group delay predictor $\gamma^-$, as follows:

$$\gamma^- = a - Ja \quad (41)$$

With reference to FIG. 13, the unit side-fed sparse superlattice shown therein includes seven unity inputs 351–357, each of which, with the exception of the uppermost input 357, is applied to the input of a respective multiplier 361 through 366. The first multiplier 361 functions to multiply the unity input by the value $-\lambda_2^-$, produced by the subtractive sparse superlattice of FIG. 7. The output of the multiplier 361 is added to the value $\gamma_{1,1}^-$ and the unity input at 352, in adder 367, to produce a second intermediate value $\gamma_{2,1}^-$. The output from multiplier 362 is added to the unity input 353, and the output of adder 367, in adder 368, to thereby produce a third intermediate value $\gamma_{3,1}^-$. The output of adder 367 is also applied to multiplier 369 which functions to multiply the value input thereto by $-\lambda_4^-$, and the product is applied to adder 370, which also receives the output of adder 368, and the value $\gamma_{3,2}^-$, to thereby produce the sum, $\gamma_{4,2}^-$. This process continues in a similar manner, as shown, until the constant group delay prediction coefficients $\gamma_{7,1}^-$ through $\gamma_{7,4}^-$ are produced. The values of $\gamma_{1,1}^-$, $\gamma_{3,2}^-$, $\gamma_{5,3}^-$ and $\gamma_{7,4}^-$ are equal to zero, but are shown in order to illustrate the natural constraint of the constant group delay problem.

Figure 14:
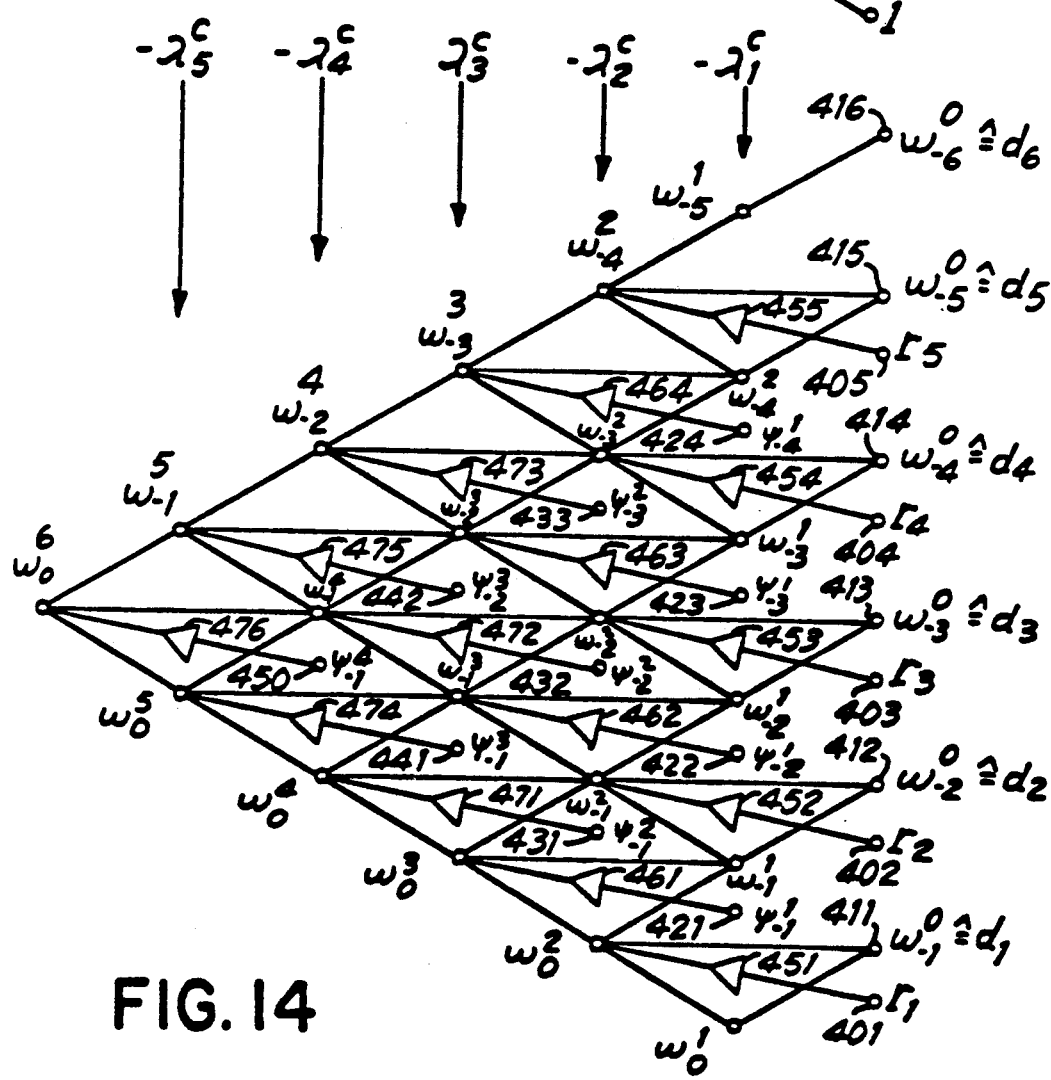
FIG. 14 is an illustration of a sparse superladder processing structure for providing optimal LS-FIR filtering.

In addition to the production of the linear phase predictor and the constant group delay predictor, the sparse superlattice structures, in accordance with the present invention, can be used for optimal LS-FIR filtering, in a manner similar to that described in co-pending application Ser. No. 021,256, referred to above. With reference to FIG. 14 a superladder structure, called the "sparse superladder", for the production of lattice filter coefficients, in conjunction with the additive sparse superlattice of FIG. 6, is shown. The sparse superladder receives autocorrelation coefficients $r_1$ through $r_5$ at inputs 401 through 405, and crosscorrelation coefficients $d_1$ through $d_6$ are applied to input terminals 411 through 416. In addition to the autocorrelation and crosscorrelation coefficients, the sparse superladder receives a number of inputs from the additive sparse superlattice of FIG. 6, specifically, in the case of a system having order 6, as shown in FIG. 14, the first intermediate values of the additive sparse superlattice, namely $\psi_{-1}^1$ through $\psi_{-4}^1$, at input terminals 421 through 424, the second intermediate values from the additive sparse superlattice, $\psi_{-1}^2$ through $\psi_{-3}^2$ at input terminals 431 through 433, third intermediate values $\psi_{-1}^3$ and $\psi_{-2}^3$ at input terminals 441 and 442, and fourth intermediate value $\psi_{-1}^4$ at input terminal 450.

Multipliers 451 through 455 each receive an associated autocorrelation coefficient $r_1$ through $r_5$. Similarly, the four first intermediate values $\psi_{-1}^1$ through $\psi_{-4}^1$ are applied to respective multipliers 461 through 464, the second intermediate values $\psi_{-1}^2$ through $\psi_{-3}^2$ are applied to respective multipliers 471, 472 and 473, third intermediate values $\psi_{-1}{}^3$ and $\psi_{-2}{}^3$ are applied to multipliers 474 and 475, respectively, and finally, the fourth intermediate value $\psi_{-1}{}^4$ is applied to multiplier 476. The multipliers in the sparse supperladder function to multiply the input quantities by one of the sparse superlattice filter coefficients $\lambda_1{}^c$, defined as follows:

$$\lambda_{m+1}{}^c = (\omega_0{}^{m+1} - \omega_0{}^m)/\psi_0{}^m \tag{42}$$

The sparse superladder of FIG. 14 is arranged so that first intermediate values $\omega_0{}^1$ through $\omega_{-5}{}^1$, second intermediate values $\omega_0{}^2$ through $\omega_{-4}{}^2$, third intermediate values $\omega_0{}^3$ through $\omega_{-3}{}^3$, fourth intermediate values $\omega_0{}^4$ through $\omega_{-2}{}^4$, fifth intermediate values $\omega_0{}^5$ through $\omega_{-1}{}^5$, and sixth intermediate value $\omega_0{}^7$, are produced in accordance with the following relationship:

$$\omega_i{}^{m+1} = \omega_i{}^m + \omega_{i-1}{}^m - \omega_{i-1}{}^{m-1} - \lambda_m{}^c \psi_{i-1}{}^{m-1} \tag{43}$$

The sparse lattice filter coefficients $-\lambda_{m+1}{}^c$ are applied to the multipliers, as shown. Specifically, filter coefficient $-\lambda_1{}^c$ is applied to multipliers 451 through 455, filter coefficient $-\lambda_2{}^c$ is applied to multipliers 461 through 464, etc., for the production of the subsequent sparse lattice filter coefficients in accordance with the above equation.

Although explained in general terms, the specific implementations of the structures shown in FIGS. 11-14, in either a fully sequential, fully parallel, or partitioned parallel manner, will be apparent to those skilled in the art in view of the foregoing description.

The additive and subtractive sparse superlattice structures of FIGS. 6 and 7, along with their ancillary structures, shown in FIGS. 11-14, are suitable for efficient hardware implementation. A small number of processors, for example three to six, each containing an adder and a multiplier, may be used for many applications with very good results and a substantial increase in processing speed over that of prior art signal processors.

It will be appreciated that the present invention allows the use of a feasible number of parallel processors to perform highly efficient signal processing. When so implemented, the parallel partitioned implementation provides the benefits of parallel processing, manageable hardware complexity, and optimal signal processing for a given number of available processors. Furthermore, the use of the sparse structures ensures minimum hardware complexity.

Various changes and variations to the present invention will occur to those skilled in the art in view of the foregoing description. It is intended that all such changes and variations be encompassed so long as the present invention is employed, as defined by the following claims.

What we claim is:

1. A signal processor for receiving autocorrelation coefficients $r_i$, where $i=0$ to P, corresponding to a system signal having order P, and for transforming the system signal to the form of a series of digital quantities $\lambda_i{}^+$, for $i=1$ to P, defined as $(1-k_i)(1+k_{i-1})$, where the quantities $k_i$ correspond to the lattice predictor coefficients, or "PARCORS," of said system, comprising:

a plurality of separate, physical adders, the number of adders being less than P;

a plurality of separate, physical multipliers, each having two inputs, the number of multipliers being less than P$-$1;

a divider;

a storage and retrieval structure for receiving said autocorrelation coefficients $r_i$, and for producing the quantity $\psi_0{}^0 = r_0/2$; and a parallel processing structure, including at least one bus and interconnections between said plurality of separate, physical adders, separate, physical multipliers, and said divider, for selectively applying, during a first time interval, (i) less than all of said autocorrelation coefficients $r_i$ to said plurality of separate, physical adders to produce an associated plurality of first intermediate values $$\psi_{-j}{}^1 = r_j + r_{j+1},$$

(ii) the values $\psi_0{}^0$ and $\psi_0{}^1$ to said divider to produce a quantity $-\lambda_1{}^+ = \psi_0{}^1/\psi_0{}^0$, (iii) less than all of said autocorrelation coefficients $r_i$ to the first inputs of said plurality of separate, physical multipliers, and the quantity $\psi_1{}^+$ to the second inputs of said plurality of separate, physical multipliers, to produce an associated plurality of first products, and (iv) at least some of said first products and adjacent pairs of said second intermediate values to at least some of said separate, physical adders, to thereby produce a plurality of second intermediate values $\psi_{-j}{}^2 = \psi_{-j}{}^1 + \psi_{-(j+1)}{}^1 - \lambda_1{}^+ r_{j+1}$;

said parallel processing structure selectively applying to said separate, physical adders and multipliers, during a second time interval, subsequent to said first time interval, additional ones of said autocorrelation coefficients $r_i$, not previously applied thereto, to produce additional ones of said first and second intermediate values.

2. The signal processor of claim 1 further including means for producing linear phase prediction coefficients $\gamma_{i,j}{}^+$ of the linear phase predictor $\gamma^+$, where $\gamma^+ = a + Ja$, a is a linear predictor, and J is defined as $$\begin{pmatrix} 00 \ldots 01 \\ 00 \ldots 10 \\ \cdot \\ \cdot \\ \cdot \\ 01 \ldots 00 \\ 10 \ldots 00 \end{pmatrix}.$$

3. The signal processor of claim 1 further including means for providing cross correlation coefficients $d_i - d_m$, and for providing FIR filter coefficients $$\lambda_m{}^c + 1 = (\omega_0{}^{m+1} - \omega_0{}^m)/\psi_0{}^m,$$

where $$\omega_i{}^{m+1} = \omega_i{}^m + \omega_{i-1}{}^m - \omega_{i-1}{}^{m-1} - \lambda_m{}^c \psi_{i-1}{}^{m-1},$$

$\omega_i{}^0$, $i = -1$ to $-m$, correspond to said cross-correlation coefficients $d_i-d_m$, and $\psi_i{}^m$ correspond to intermediate values of order m.

4. A signal processor for receiving autocorrelation coefficients $r_i$, where $i=0$ to P, corresponding to a system signal having order P, and for transforming the system signal to the form of a series of digital quantities $\lambda_i{}^-$, for $i=2$ to P, defined as $(1+k_i)(1-k_{i-1})$, where the quantities $k_i$ correspond to the lattice predictor coefficients, or "PARCORS," of said system, comprising:

a plurality of separate, physical adders, the number of adders being less than $P-1$;

a plurality of separate, physical multipliers, each having two inputs, the number of multipliers being less than $P-2$;

a divider;

a storage and retrieval structure for receiving said autocorrelation coefficients, and for producing a plurality of differences $\phi_{-j}^1$, where $j=0$ to $P-1$, and where $\phi_{-j}^1 = r_j - r_{j+1}$; and a parallel processing structure, including at least one bus and interconnections between said plurality of separate, physical adders, separate, physical multipliers, and said divider, for selectively applying, during a first time interval, (i) less than all of said differences $\phi_{-j}^1$ to said plurality of separate, physical adders to produce an associated plurality of second intermediate values $\phi_{-j}^2 = \phi_{-j}^1 + \phi_{-(j+1)}^1$, (ii) the values $\phi_o^1$ and $\phi_o^2$ to said divider to produce a quantity $-\lambda_2^- = \phi_o^2/\phi_o^1$, (iii) less than all of said differences $\phi_{-j}^1$ to the first inputs of said plurality of separate, physical multipliers, and the quantity $-\lambda_2^-$ to the second inputs of said plurality of separate, physical multipliers, to produce an associated plurality of first products, and (iv) at least some of said first products and adjacent pairs of said second intermediate values to at least some of said separate, physical adders, to thereby produce a plurality of third intermediate values $\phi_{-j}^3 = \phi_{-j}^2 + \phi_{-(j+1)}^2 - \lambda_2^- \phi_{-(j+1)}^1$;

said parallel processing structure selectively applying to said separate, physical adders and multipliers, during a second time interval, subsequent to said first time interval, additional ones of said differences $\phi_{-j}^1$, not previously applied thereto, to produce additional ones of said second and third intermediate values.

5. The signal processor of claim 4 further including means, for producing constant group delay prediction coefficients $\gamma_{i,j}^-$ of the linear phase predictor $\gamma^-$, where $\gamma = a - Ja$, a is a linear predictor and J is defined as $$\begin{pmatrix} 00 \ldots 01 \\ 00 \ldots 10 \\ \vdots \\ 01 \ldots 00 \\ 10 \ldots 00 \end{pmatrix}$$

* * * * *